US012164649B2

(12) United States Patent
Castiglione et al.

(10) Patent No.: US 12,164,649 B2
(45) Date of Patent: Dec. 10, 2024

(54) SYSTEM AND METHOD FOR ADVERSARIAL VULNERABILITY TESTING OF MACHINE LEARNING MODELS

(71) Applicant: ROYAL BANK OF CANADA, Toronto (CA)

(72) Inventors: Giuseppe Marcello Antonio Castiglione, Toronto (CA); Weiguang Ding, Toronto (CA); Sayedmasoud Hashemi Amroabadi, Toronto (CA); Ga Wu, Toronto (CA); Christopher Côté Srinivasa, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 230 days.

(21) Appl. No.: 17/750,205

(22) Filed: May 20, 2022

(65) Prior Publication Data
US 2022/0382880 A1    Dec. 1, 2022

Related U.S. Application Data

(60) Provisional application No. 63/191,229, filed on May 20, 2021.

(51) Int. Cl.
*G06F 21/00*     (2013.01)
*G06F 21/57*     (2013.01)
*G06N 3/048*     (2023.01)
*G06N 3/08*      (2023.01)

(52) U.S. Cl.
CPC .......... *G06F 21/577* (2013.01); *G06N 3/048* (2023.01); *G06N 3/08* (2013.01); *G06F 2221/034* (2013.01)

(58) Field of Classification Search
None
See application file for complete search history.

(56) References Cited

U.S. PATENT DOCUMENTS

2020/0134468 A1*  4/2020  Ding .................... G06V 10/764
2020/0265271 A1*  8/2020  Zhang .................. G06V 10/776

OTHER PUBLICATIONS

Adversarial Attacks and Defences: A Survey, Anirban Chakraborty et al., arXiv: 1810.00069v1 dated Sep. 28, 2018.
Adversarial vulnerability for any classifier, Alhussein Fawzi et al., arXiv: 1802.08686v2 dated Nov. 30, 2018.
(Continued)

*Primary Examiner* — Andrew J Steinle
(74) *Attorney, Agent, or Firm* — Norton Rose Fulbright Canada LLP

(57) ABSTRACT

A system and method for adversarial vulnerability testing of machine learning models is proposed that receives as an input, a representation of a non-differentiable machine learning model, transforms the input model into a smoothed model and conducts an adversarial search against the smoothed model to generate an output data value representative of a potential vulnerability to adversarial examples. Variant embodiments are also proposed, directed to noise injection, hyperparameter control, and exhaustive/sampling-based searches in an effort to balance computational efficiency and accuracy in practical implementation. Flagged vulnerabilities can be used to have models re-validated, re-trained, or removed from use due to an increased cybersecurity risk profile.

20 Claims, 18 Drawing Sheets

(56) References Cited

OTHER PUBLICATIONS

Benchmarking Adversarial Robustness on Image Classification, Yinpeng Dong et al., dated 2020.
Certified Adversarial Robustness via Randomized Smoothing, Jeremy Cohen et al., arXiv: 1902.02918v2 dated Jun. 15, 2019.
Why Do Adversarial Attacks Transfer? Explaining Transferability of Evasion and Poisoning Attacks, Ambra Demontis et al., arXiv:1809.02861v4 dated Jun. 13, 2019.
Greedy Function Approximation: A Gradient Boosting Machine, Jerome H. Friedman, IMS 1999 Lecture, dated Feb. 24, 1999 (modified Mar. 15, 2000, Apr. 19, 2021).
On Evaluating Adversarial Robustness, Nicholas Carlini et al., arXiv: 1902.06705v2 dated Feb. 20, 2019.
Random Forests, Leo Breiman, Statistics Department, University of California dated Jan. 2001.
Robust Decision Trees Against Adversarial Examples, Hongge Chen et al., arXiv: 1902.10660v2 dated Jun. 11, 2019.
Trees vs Neurons: Comparison between random forest and ANN for high-resolution prediction of building energy consumption, Muhammad Waseem Ahmad et al., http://dx.doi.org/10.1016/j.enbuild.2017.04.038 dated Jul. 2017.
Xgboost: eXtreme Gradient Boosting, Tianqi CHEN et al., Package Version: 1.4.1.1 dated Apr. 22, 2021.
ZOO: Zeroth Order Optimization Based Black-box Attacks to Deep Neural Networks without Training Substitute Models, Pin-Yu Chen et al., arXiv: 1708.03999v2 dated Nov. 2, 2017.
Black-box Adversarial Attacks with Limited Queries and Information, Andrew Ilyas et al., arXiv: 1804.08598v3 dated Jul. 11, 2018.
Cross-Domain Transferability of Adversarial Perturbations, Muzammal Nasser et al., arXiv: 1905.11736v5 dated Oct. 14, 2019.
DeepSafe: A Data-driven Approach for Checking Adversarial Robustness in Neural Networks, Divya Gopinath et al., arXiv:1710.00486v2 dated Jan. 30, 2020.
Delving Into Transferable Adversarial Examples and Black-Box Attacks, Yanpei Liu et al., arXiv: 1611.02770v3 dated Feb. 7, 2017.
Evasion and Hardening of Tree Ensemble Classifiers, Alex Kantchelian et al., arXiv: 1509.07892v2 dated May 27, 2016.
Explainable, Trustworthy, and Ethical Machine Learning for Healthcare: A Survey, Khansa Rasheed et al.
Explaining and Harnessing Adversarial Examples, Ian J. Goodfellow et al., arXiv: 1412.6572v3 dated Mar. 20, 2015.
Fooling a Real Car with Adversarial Traffic Signs, Nir Morgulis et al., Harman International, Automotive Security Business Unit.
DeepFool: a simple and accurate method to fool deep neural networks, Seyed-Mohsen Moosavi-Dezfooli et al., arXiv: 1511.04599v3 dated Jul. 4, 2016.
Improving Transferability of Adversarial Examples with Input Diversity, Cihang Xie et al., arXiv: 1803.06978v4 dated Jun. 1, 2019.
Intriguing properties of neural networks, Christian Szegedy et al., arXiv: 1312.6199v4 dated Feb. 19, 2014.
Adversarial Examples in the Physical World, Alexey Kurakin et al., arXiv: 1607.02533v4 dated Feb. 11, 2017.
Reluplex: An Efficient SMT Solver for Verifying Deep Neural Networks, Guy Katz et al., arXiv: 1702.01135v2 [cs.AI] dated May 19, 2017.
Soft Decision Trees, Ozan Irsoy et al., 21st International Conference on Pattern Recognition (ICPR 2012) dated Nov. 11-15, 2012.
The Space of Transferable Adversarial Examples, Florian Tramer et al., arXiv: 1704.03453v2 dated May 23, 2017.
Towards Deep Learning Models Resistant to Adversarial Attacks, Aleksander Madry et al., arXiv: 1706.06083v4 dated Sep. 4, 2019.
Adversarial Risk and the Dangers of Evaluating Against Weak Attacks, Jonathan Uesato et al., arXiv: 1802.05666v2 dated Jun. 12, 2018.

* cited by examiner (b) Sampled (c) Exhaustive

SYSTEM AND METHOD FOR ADVERSARIAL VULNERABILITY TESTING OF MACHINE LEARNING MODELS

CROSS-REFERENCE

This application is a non-provisional of, and claims all benefit, including priority to, U.S. Application No. 63/191,229, filed 20 May 2021, entitled "SYSTEM AND METHOD FOR ADVERSARIAL VULNERABILITY TESTING OF MACHINE LEARNING MODELS", incorporated herein by reference in its entirety.

FIELD

Embodiments of the present disclosure relate to the field of machine learning, and more specifically, embodiments relate to devices, systems and methods for scalable whitebox attacks on non-differentiable machine learning models, such as tree-based models.

INTRODUCTION

Adversarial robustness is an important safety criteria for assessing the reliability of machine learning models. Adversarial robustness is important due to technical limitations in human understanding and diagnoses in relation to debugging machine learning models.

Adversarial examples can be generated, for example, through slight perturbations of inputs (either inadvertent or malicious) which yield errors in the machine learning model. A simple example of a vulnerability to adversarial examples through perturbations includes intentionally applying a filter to an image classified at 57.7% confidence as a panda (which is correctly an image of a panda), and yielding a visually indistinct image of the panda that instead is classified as a gibbon at 99.3% confidence.

These adversarial examples operate due to errors at the margin of classification, and the strength of an attack, for example, can be tuned using a parameter, epsilon. While various adversarial robustness testing approaches are available, existing approaches are incompatible with non-differentiable models such as tree ensembles.

SUMMARY

Systems, methods, and corresponding non-transitory computer readable media are proposed herein for scalable whitebox attacks on non-differentiable models, such as tree-based models. As non-differentiable models, such as tree ensembles are widely used in industry, the lack of analytical tools for assessing adversarial example vulnerability in these types of models reveals a crucial gap between adversarial robustness research and practical applications.

The approach described herein can be practically encapsulated in the form of a diagnosis tool that receives as inputs, a data representation of an original trained non-differentiable machine learning model (e.g., a tree-based model), applies transformations to the original machine learning model to generate a smoothed version of the machine learning model, conducts gradient ascent-based adversarial example searches on the smoothed version of the machine learning model, and outputs a data structure representing a metric or data value indicating vulnerabilities to adversarial examples.

The diagnosis tool can be incorporated into a machine learning framework system, for example, as a set of code functions stored in a library in the form of computer instructions that can be called to perform the steps of a computational method. For example, the diagnosis tool can be interfaced with as a command-line interpreter command, or a dedicated machine learning analysis server that is connected across a message bus or network interfaces to upstream and downstream computing devices, where upstream computing devices can pass in models for validation, and downstream computing devices can be configured to use validation outputs to control aspects of the operation of the models, such as swapping models, alternating models, de-commissioning models, etc., where models are determined to be potentially vulnerable. In this example, the diagnosis tool can be a physical server appliance residing at a physical data center.

The proposed approach smooths the tree ensembles, for example, through temperature-controlled sigmoid functions which enables gradient descent-based adversarial attacks. In some embodiments, different variations of the smoothed model can be established based on different temperature hyperparameters, and analysis can be run on an ensemble of different smoothed models, or in another embodiment, an optimized temperature hyperparameter can be determined first prior to analysis. In yet another embodiment, the temperature hyperparameter can be incrementally increased by the tool to determine a minimum epsilon that yields vulnerabilities to adversarial examples.

The temperature hyperparameter controls characteristics of smoothing (e.g., a higher temperature yields more "smoothing"), at a trade-off in accuracy in terms of relevance of an adversarial attack against the original machine learning model. For example, at a lower temperature smoothing, the smoothed machine learning model more closely approximates the original machine learning model. At a higher temperature smoothing, the smoothed machine learning model is easier to conduct gradient ascent (from a computational perspective), but has less fidelity to the original machine learning model. Having less fidelity to the original machine learning model means that an adversarial attack that is estimated by the tool may not actually be an adversarial attack that functions on the original machine learning model. By iteratively increasing the temperature, the loss of fidelity can be managed. In some embodiments, the proposed approach further leverages sampling and log-derivative approaches (e.g., practical applications of the log-derivative relation) that significantly scale up practical usage by improving computational ease in analysis.

Applicants compared the approach against both random perturbations and combinatorial optimization approaches on multiple public datasets (and corresponding models) in the experiments to assess the proposed approach's effectiveness and efficiency.

The experimental results show the proposed approach can 1) successfully reveal the adversarial vulnerability of tree ensemble models without causing computational pressure for testing and 2) flexibly balance the search performance and time complexity to meet various practical testing criteria and computational constraints.

The log-derivative approach described in some embodiments herein was also shown to reduce computational efforts required for analysis. The proposed method was shown to have competitive performance compared to more computationally expensive approaches (which took much longer run-times, requiring multiples of the run-time, for example). A number of variations are possible—for example, an exhaustive variant approach and a sampling variant approach.

A search time comparison between embodiments of specific proposed approaches described herein and alternate approaches suggests a significant potential decrease in computational search time required, which is a major consideration in practical implementation on constrained computer resources.

Corresponding computer implemented methods, and non-transitory computer readable media are contemplated.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1A:
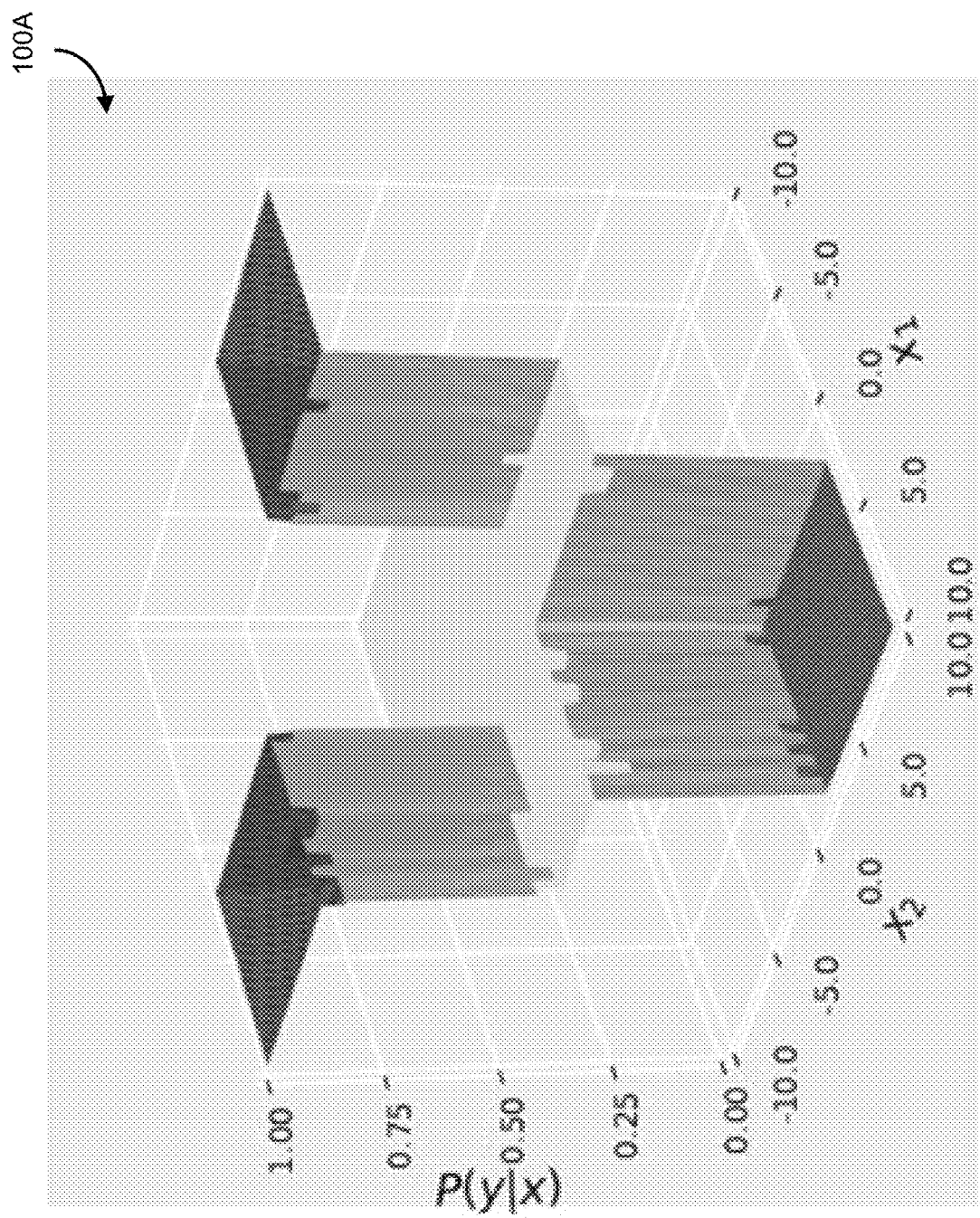
FIG. 1A, 1B, 1C provide decision surface comparison between tree ensemble smoothing and original model with different smoothing temperature.

Adversarial robustness is an important safety criterion for assessing the reliability of machine learning models, and many approaches are incompatible with non-differentiable models such as tree ensembles. Since tree ensembles are widely useful, this reveals a crucial gap between adversarial robustness research and practical applications. As described herein, systems, methods, and non-transitory computer readable media (e.g., media storing software instructions for controlling a computer processor) are described that is directed to providing a computationally practical and useful tool for adversarial vulnerability testing of machine learning models.

The tool can generate useful computational outputs, such as data structures to be communicated to downstream machine learning re-training mechanisms (e.g., to automatically initiate a re-training data process), reports (e.g., a Boolean output indicating TRUE/FALSE for vulnerabilities or a data value indicating a particular estimated range/epsilon value for vulnerability comparison) or dashboards (e.g., rendered on a graphical user interface indicating potential vulnerabilities to adversarial robustness).

The diagnosis tool can be incorporated into a machine learning framework system, for example, as a set of code functions stored in a library in the form of computer instructions that can be called to perform the steps of a computational method.

An adversarial robustness testing approach is proposed that is adapted mainly for tree ensemble models but can be applicable to other non-differentiable models. Other types of models that this approach may be applicable, for example, various piece-wise models, k-nearest neighbor models, etc. Applicants' experiments focused primarily on tree ensemble models.

Concretely, the proposed approach is directed to a computational mechanism that smooths the non-differentiable models (e.g., tree ensembles) through the temperature-controlled sigmoid functions which enables gradient descent-based adversarial attacks. In addition, the proposed approach in some embodiments leverages sampling and log-derivative approach (e.g., trick) that significantly scale up its practical application. Experimental results validate that there is significant computational efficiency that is possible while maintaining a satisfactory level of performance.

Applicants compared the approach against both random perturbations and combinatorial optimization approaches on multiple public datasets (and corresponding models) in the experiments to justify the proposed approach's effectiveness and efficiency. The experimental results indicate that the proposed method can 1) successfully reveal the adversarial vulnerability of tree ensemble models without causing computational pressure for testing and 2) flexibly balance the search performance and time complexity to meet various testing criteria. The computational search time of some embodiments of the proposed approach was found to be improved relative to alternative approaches given a comparable level of output accuracy.

As described herein, machine learning (ML) models are proven to be vulnerable to adversarial examples, which are small but carefully crafted distortions of inputs created by adversaries that could yield incorrect results from the ML models (e.g., "fool" the models).

For safety-sensitive applications (e.g. finance, health service, and autopilot systems), such adversarial vulnerability issue could result in catastrophic consequences, which has raised attention from the research community. In particular, effectively verifying the adversarial robustness before model deployment is one of the most crucial challenges facing machine learning. However, practical adversarial example vulnerability estimation tools are also constrained by an amount of computational resources, and the approaches are required to run on finite resources in a reasonable period of time. This can become increasingly challenging as the complexity of the models increases. For example, it may be required that the system is able to process models overnight (or in some cases, in real or near-real time), and conversation of computational resources is important.

Other adversarial robustness testing approaches mainly focus on deep learning models, for example, other approaches proposed a SMT Solver based model verification method for neural network models with Relu activation function, and others introduced a data-guided methodology to determine regions that are likely to be safe (instead of focusing on individual points). To demonstrate the testing effectiveness, most of the other proposed testing approaches are evaluated on image tasks that are hard to verify in other application domains.

Despite their testing effectiveness on deep learning models, Applicants note existing approaches do not appear to support non-differentiable models that are widely useful in the industry. Indeed, many ML models used in product lines are the tree ensemble models due to the model computational efficiency and transparency (with readable interpretations for humans). This fact reveals a crucial gap between adversarial robustness research and practical applications.

To address this technological gap, other approaches include a white-box attack method using Mixture Integer Linear Programming (MILP) to avoid computing gradient, or formulated adversarial robustness test into a maximum cliques enumeration task which shows better scalability than MILP solution. While these approaches are effective in identifying the model vulnerability on the adversarial attack, they appear to be computationally expensive, limiting the scalability of testing in practice.

Accordingly, Applicants propose an improved adversarial robustness testing approach that is mainly for tree ensemble models that has certain technical features that address some of the technical shortcomings in other approaches. The approach is encapsulated as a practical tool for assessing adversarial vulnerabilities, which, for example, can include a software tool, a hardware tool, a configured computer, a dedicated computing appliance (e.g., a special purpose machine), among others, controlling a physical computer processor and computer memory in accordance with approaches described herein. The approach of some embodiments is adapted to reduce an overall required search time for vulnerability assessment, which is a key technical challenge in practical implementation.

In particular, the approach proposed herein is adapted to enable (e.g., unlock) gradient descent-based adversarial robustness testing on tree ensemble models by smoothing the trees.

By replacing each decision node in a tree with a temperature-controlled sigmoid function, Applicants can approximate the original target model with a controllable error gap.

While the smoothed trees appear to be similar to the Soft Decision Trees, the approach is conducted post-processing, and a benefit is that this approach does not need to assume having access to the training process of the target tree ensemble model.

In addition, to facilitate efficient adversarial example search, Applicants propose two variants of searching schema by either injecting noise during gradient descent or introducing reinforce techniques to approximate the gradients. For the noise-based approach, different noise-based approaches were considered, including using spherical noise, as well as sparse noise. In a more specific embodiment, the system is configured to utilize sparse noise as the input as relative to spherical noise, the search space can be more efficient as less sampling is wasted (e.g., for sphere noise the search space is larger, and much of the sampling is wasted).

To demonstrate the effectiveness of the proposed approach, Applicants compared it against multiple baseline approaches, such as random perturbation, combinational optimization, and black box attack methods on multiple public datasets (and corresponding models). The experimental results show the proposed method can 1) successfully reveal the adversarial vulnerability of tree ensemble models without causing computational pressure for testing, and 2) flexibly balance the search performance and time complexity to meet various testing criteria. The results also show a decrease in search time relative to alternative approaches.

Before proceeding to the describing the approach of some embodiments, a comparison and discussion of alternate approaches the field of adversarial robustness testing is provided. To facilitate the description of the proposed model, Applicants will also review the tree ensemble models.

Adversarial Robustness Testing

The concern of adversarial robustness reveals the vulnerability of deep networks with respect to adversarial noise.

Fast Gradient Sign Method (FGSM) was then proposed to test the robustness of the neural networks by generating adversarial examples through a one-step update. Later, Basic Iterative Method (BIM) extended FGSM by introducing multi-step gradient updates that result in a better success rate.

Similar to the BIM, Projected Gradient Descent (PGD) suggested random initialization for adversarial example search. Another line of FGSM extension, such as DeepFool, focuses on generating adversarial examples by minimizing perturbation.

All of the above approaches are based on the assumption that the target model is accessible during adversarial example search, which is also called white-box attack in the literature.

Considering a more practical situation where the model is inaccessible or non-differentiable, many works focus on estimating gradient information through numerical approximation. ZOO estimates the gradient at each coordinate by finite differences.

Similarly, NES and SPSA numerically estimate gradients by drawing random samples. Also, later research demonstrated that adversarial examples could be transferred across models; the adversarial example crafted on one model is likely to fool the other models. This discovery reflects another line of black-box adversarial robustness testing by training duplicated models for adversarial example search.

Decision Tree, Tree Ensemble Models, and Soft Trees

Decision tree models are adapted to make predictions depending on the value of the leaf node to which the input observation x belongs, where the leaf node is determined by following the decision trajectory of the input x from the root. Specifically, in each internal decision node k of a tree t denoted as $\mathcal{F}_{t,k}$, the input x is categorized (or directed) to one of the child nodes based on a simple statement (or condition) such as $x_j > v_k$ for certain feature j and constant $v_k$. Since the entire decision-making process could be formatted as a decision rule with a set of the propositional statements, the decision tree is widely used in the industry for its transparency.

Tree ensemble models make the output prediction(s) by combining decisions from multiple decision trees with expectation.

Specifically, given |T| decision trees $\{\mathcal{D}_1 \ldots \mathcal{D}_{|T|}\}$ with tree contribution weight $w \in \mathbb{R}^{|T|}$, the prediction of the tree ensemble model is $$\hat{y} = \mathcal{M}(x) = \underbrace{\sum_{t=1}^{|T|} w_t \mathcal{D}_t(x)}_{\text{for regression}} \text{ and} \tag{1}$$

$$\hat{y} = \underset{c}{\text{argmax }} \mathcal{M}(x) = \underbrace{\underset{c}{\text{argmax}} \sum_{t=1}^{|T|} w_t I[\mathcal{D}_t(x) = c]}_{\text{for classification}},$$

where $I[\cdot]$ denotes the indicator function and $c \in C$ denotes the class index. This formulation applies to most of the well-known tree ensemble models, such as Random Forest, Boosted Trees, and XGBoost. In this discussion, Applicants consider adversarial robustness testing for classification models.

Large Scale/Fast Adversarial Robustness Testing on Tree Ensembles

Given a predictive model $\hat{y}=\mathcal{M}(x)$ for reliability testing, the adversarial robustness testing of various embodiments described herein aims to search adversarial example x' (for each testing sample x) such that the example causes the model violate criteria tuple $(\Phi, \Psi, \in, \delta)$ by allowing:

$$\Psi(\mathcal{M}(x'), \mathcal{M}(x)) > \delta \text{ when } \Phi(x', x) \leq \in, \qquad (2);$$

where $\Phi$ denotes distance of inputs, $\Psi$ denotes distance of predictions, $\in$ denotes perturbation criteria, and $\delta$ denotes the tolerance of prediction shifting. Input distance $\Phi$ is usually $l_\infty$ norm, whereas output distance $\Psi$ is the $l_1$ norm (absolute difference).

The adversarial robustness describes how well the model can preserve its prediction given the input data point is perturbed.

A fast adversarial robustness testing approach is proposed herein on models (e.g., tree ensemble models) through iterative gradient ascent.

Applicants first describe how to adapt the system to smooth the trees to support gradient ascent. Then, Applicants show how to adapt the system to conduct the adversarial example search on smoothed trees. The smoothing step is technically important as it aids in the later gradient descent, and there are different approaches to generating the smoothed trees (e.g., with different hyperparameters).

Tree Ensemble Smoothing Through Branching Node Relaxation

Among various white-box adversarial attack methods, gradient ascent-based approaches usually show a significant advantage in effectiveness and computational efficiency (with the existing toolboxes for auto-differentiation). To enable such an attack on the tree ensemble models, Applicants propose to smooth the tree ensembles to support auto-differentiation.

As reviewed above, the prediction of a tree ensemble is a linear combination of predictions from a set of decision trees. Since the decision tree could be factorized as a set of piece-wise branching nodes, the system can be configured to process a decision tree by replacing the branching nodes with a sigmoid function based variation. Each node can be represented in the form of a data representation having computational weights or logic representative of branching conditions. An approach is provided below for the transformation from a branching node data representation to a sigmoid function based representation.

In an illustrative example, a simple branching node can be conceptualized as a cat/dog identifier using ear shapes, where rounded shapes are indicative of a cat, and sharper shapes are indicative of a dog. A sigmoid function in this example would not output a specific binary yes/no answer, but rather, it gives a probabilistic answer— 80% cat, 20% dog.

Concretely, for a binary intermediate node $k \in \{1 \ldots |K|\}$ of a tree $\mathcal{D}_t$ with branching condition $x_j > v_k$ in the form of $$\mathcal{D}_{t,k}(x) = \begin{cases} \mathcal{D}_{t,k}^{left}(x) & x_j > v_k \\ \mathcal{D}_{t,k}^{right}(x) & \text{otherwise} \end{cases},$$

The proposed approach relaxes, through transformation, each of the intermediate nodes with probabilistic distributions such that:

$$\widetilde{\mathcal{D}}_{t,k}(x) = \mathcal{Q}_{t,k}^{left}(x) \widetilde{\mathcal{D}}_{t,k}^{left}(x) + \mathcal{Q}_{t,k}^{right}(x) \widetilde{\mathcal{D}}_{t,k}^{left}(x), \qquad (3)$$

where the distribution could be simple sigmoid functions of inputs:

$$\mathcal{Q}_{t,k}^{left}(x) = sigmoid\left(\frac{x_j - v_k}{\sigma_j}\right) \text{ and } \mathcal{Q}_{t,k}^{right}(x) = 1 - \mathcal{Q}_{t,k}^{left}(x). \qquad (4)$$

Here, Applicants introduced standard derivation $\sigma_j$ of feature j in the training set into the sigmoid function to normalize the signals from all decision nodes.

Hence, the prediction of the smoothed tree ensemble $\widetilde{\mathcal{M}}$ could be represented as $$\hat{y} = \underset{c}{\arg\max}\, \widetilde{\mathcal{M}}(x) = \underset{c}{\arg\max} \sum_{t=1}^{|T|} w_t \underbrace{\sum_{p=1}^{|P_t|} v_p \prod_{l=1}^{|L_p|} \mathcal{Q}_{t,l}^p(x)}_{\widetilde{\mathcal{D}}_t(x)}, \qquad (5)$$

where $P_t$ denotes a set of possible paths of a tree t, $l \in L_p$ denotes the l'th node in the decision path p, and $v_p \in C$ denotes the leaf node value of path p.

While the approach on smoothing tree ensemble appears similar to the smoothing approach introduced in Soft Decision Tree, an important difference is that Applicants smooth the tree ensembles as a post-processing instead of training single decision tree from scratch.

Figure 1B:
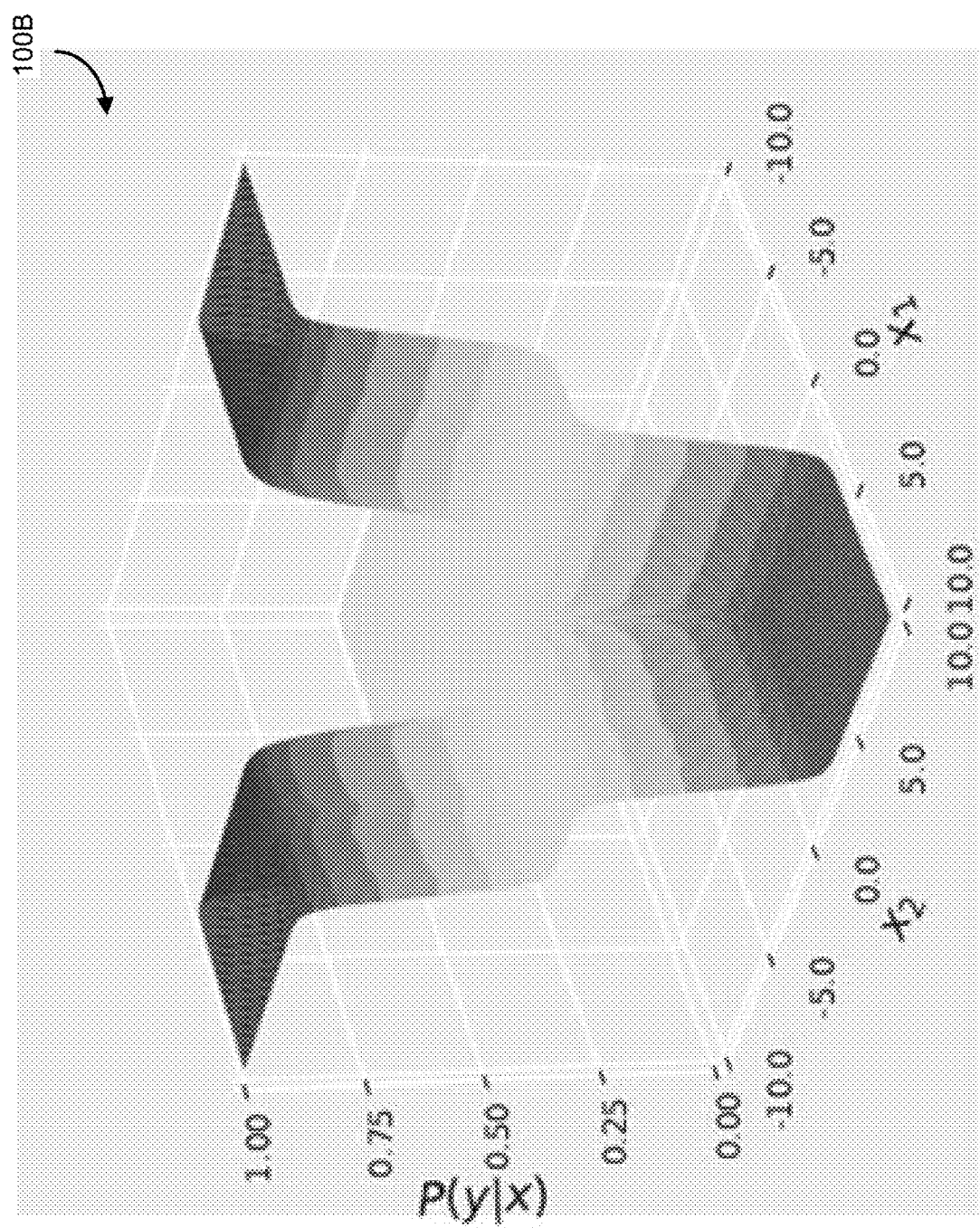
Figure 1C:
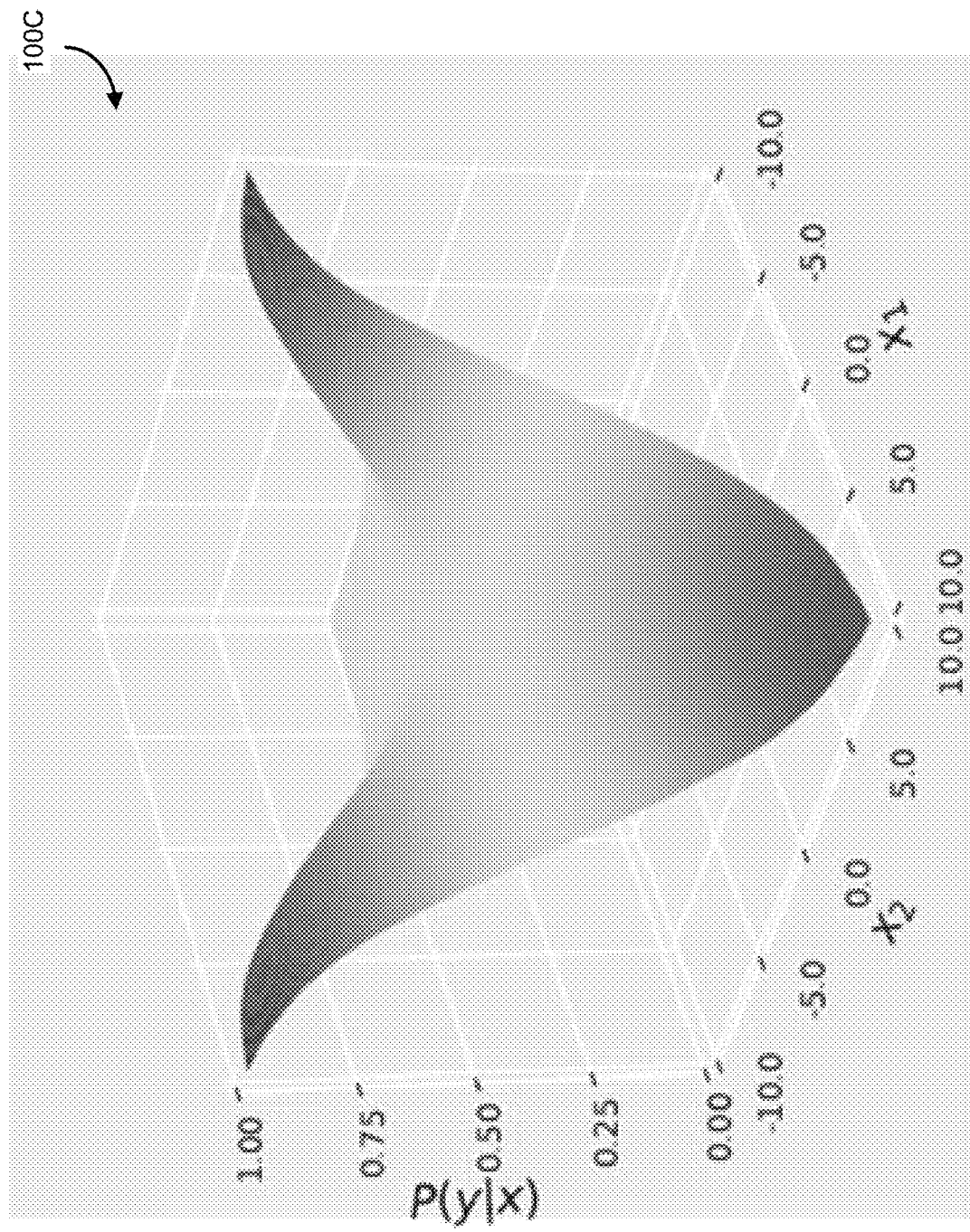

FIG. 1A, 1B, 1C provide decision surface comparison between tree ensemble smoothing and original model with different smoothing temperature. FIG. 1A shows the original tree ensemble as a decision surface 100A. FIG. 1B shows a decision surface 100B on a low temperature approximation $\tau=0.01$ that maximizes the decision boundary preservation. FIG. 1C is a high temperature approximation 100C $\tau=0.1$ with smoother decision surface that facilitate gradient ascent. Other values of $\tau$ are possible. As is shown in these different decision surfaces, the selection of the hyperparameter $\tau$ has important downstream practical implications.

Balance Gradient Ascent Efficiency and Decision Surface Preservation

While smoothing tree ensembles with simple sigmoid function is sufficient for enabling gradient ascent computation, Applicants note the smoothed model may cause two potential technical problems: 1) significant prediction gaps between smoothed model and original model, and 2) gradient vanishing due to saturated forward propagation over sigmoid functions.

Proposed approaches to overcome these technical problems are described below. These proposed solutions incur different technical trade-offs in performance and accuracy and are adapted to improve computational feasibility to provide solutions that are practically implementable given real-world constraints on computational resources and time. For example, constraints can include limited processing power on portable devices, real-time constraints on processing time, among others.

Applicants introduce into the system, a hyper-parameter T, to control the activation of sigmoid function (also called tempered sigmoid in literature) such that:

$$\mathcal{Q}_{t,k}^{left}(x) = sigmoid\left(\frac{x_j - v_k}{\tau \sigma_j}\right). \qquad (6)$$

FIGS. 1A, 1B, and 1C, above demonstrated the effect of controlling temperature hyper-parameter T. As described herein, a specific approach for controlling the temperature hyper-parameter can be adapted for automated use in the system to iteratively shift the temperature hyper-parameter.

The higher temperature results in a smoother decision surface while severely increases the approximation gap between smoothed model and the original model. Furthermore, low temperature may not support adversarial example search (as it is near piecewise).

In particular, it is shown that, when $\tau \to 0$ with limit, the smoothed tree ensemble will fall back to the original model.

Gradient Ascent Based Adversarial Example Search on Smoothed Trees

According to Basic Iterative Method, given data point (x,y), gradient ascent based search aims to create potential adversarial example x' by iteratively maximizing prediction cost function $\mathcal{J}(\mathcal{M},x,y)$ with:

$$x^{(i+1)} = x^{(i)} + \nabla_x \mathcal{J}(\widetilde{\mathcal{M}}, x^{(i)}, y) \text{ for } i \in 1 \ldots |I|, \quad (7)$$

where $x^{(0)} = x$ as starting point. As mentioned previously, adversarial robustness testing typically comes with constraints that valid adversarial example x' has to flip the model prediction with minimum confidence gap δ while holding input distance to original input x less than perturbation tolerance ∈. The proposed approach can be configured to halt the search based on two conditions:

Perturbation is over the tolerance: $\Phi(x^{(i)}, x) >= \in$.

Search is over the maximum iterations: $i >= |I|$.

Noise Injected Gradient Ascent and Search Coverage Maximization

FIGS. 2A-2D are illustrative of adversarial example searching with/without noise injection on smoothed tree ensemble.

Figure 2A:
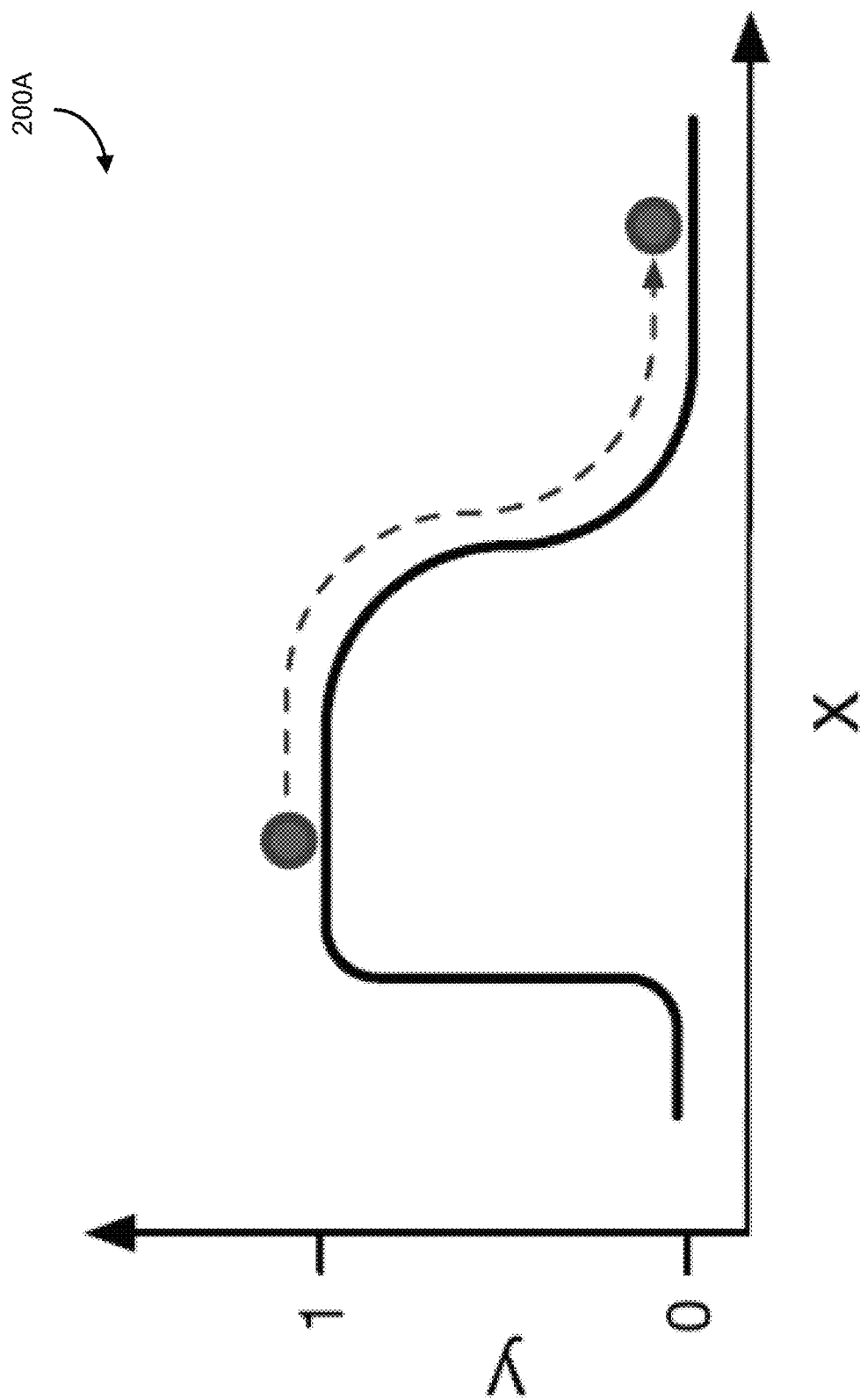
FIGS. 2A-2D are illustrative of adversarial example searching with/without noise injection on smoothed tree ensemble.

FIG. 2A is a conceptual illustration of a pure gradient 200A, as since smoothed tree ensembles preserve near piecewise decision surface, it may lead the search to suboptimal direction.

Figure 2B:
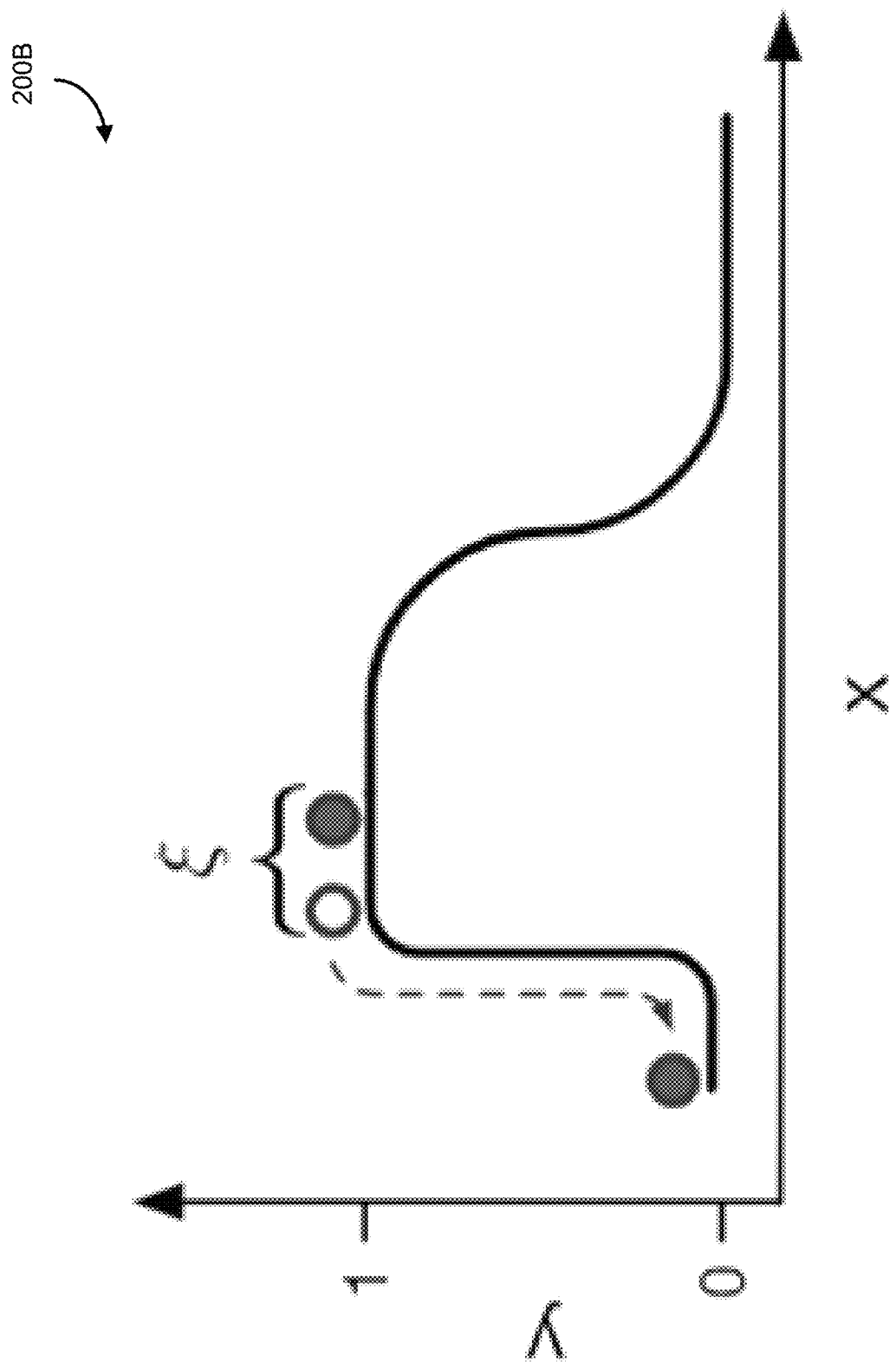

FIG. 2B is a conceptual illustration of a noise injected approach 200B, where by injecting noise ξ into the search, the system may find adversarial examples with shorter traveling distance.

Figure 2C:
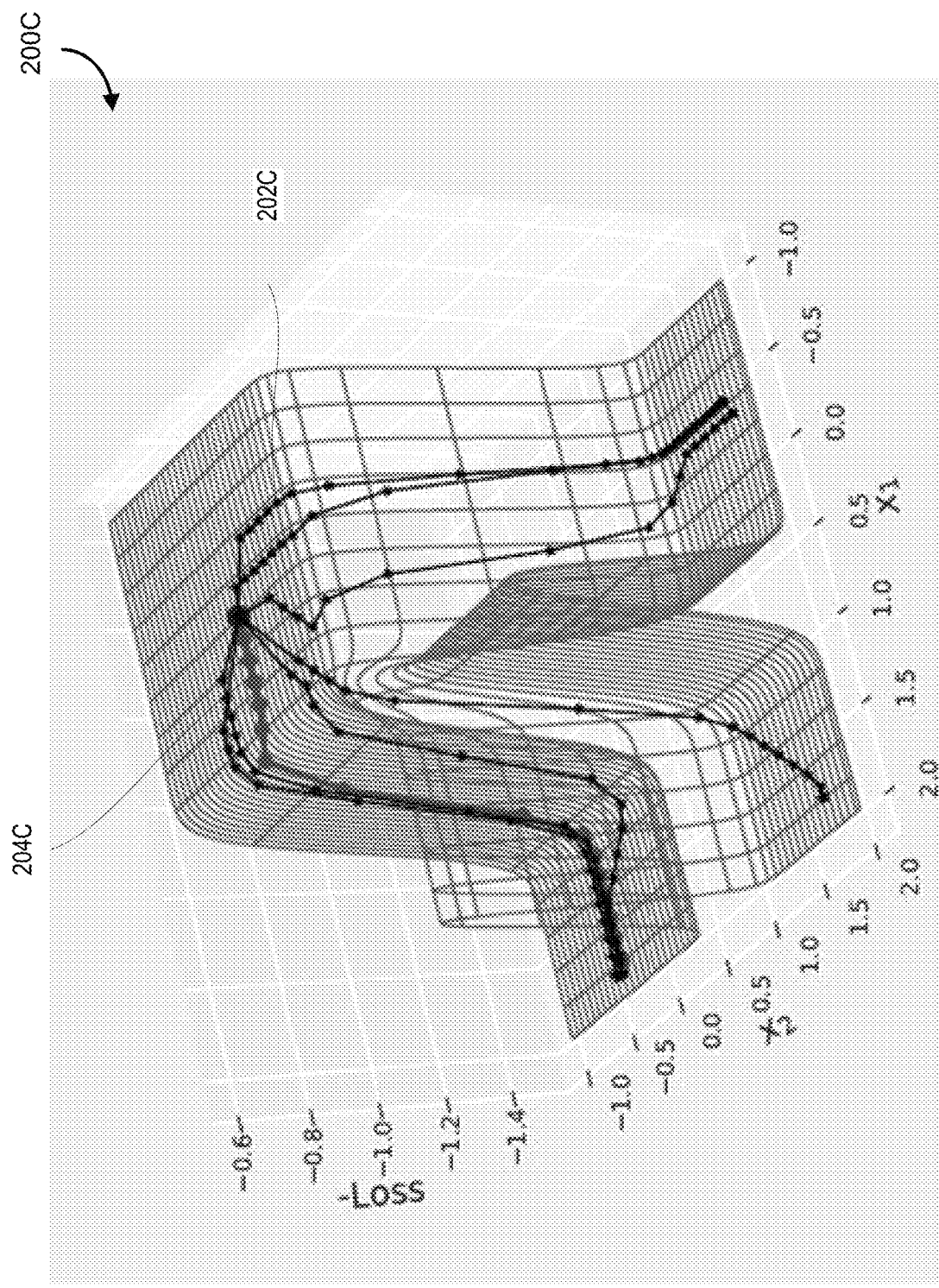
Figure 2D:
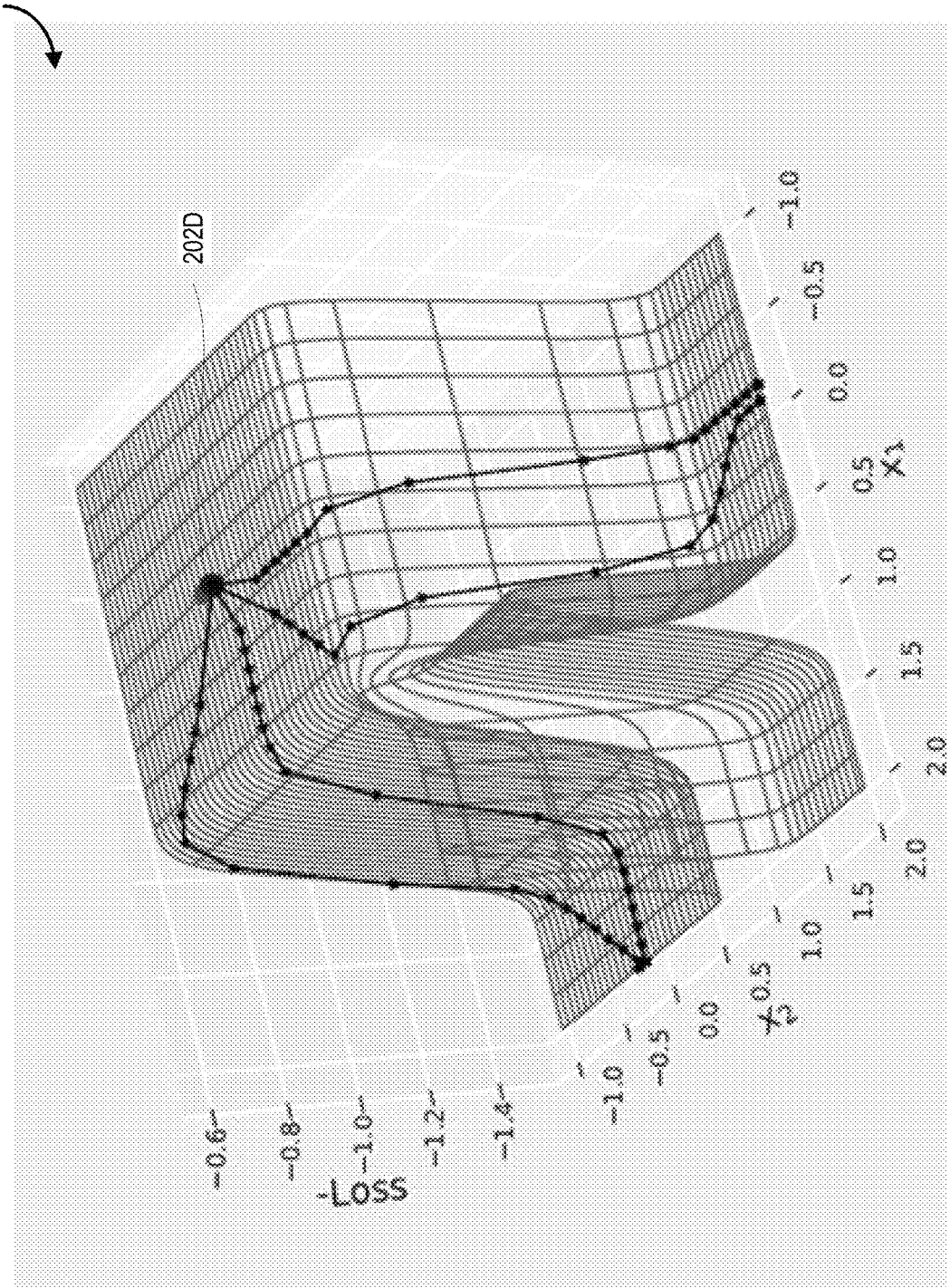

FIG. 2C and FIG. 2D illustrate in graphs 200C and 200D that noise injection allows better coverage of searching (black star trajectories shown as 202C), while a pure gradient would either lead suboptimal solution or stuck on the platform (only using red circle trajectory 204C is suboptimal).

In FIG. 2D, the example gradient approach is shown "stuck" in a local valley, shown by point 202D.

The travel direction of the largest gradient does not necessarily lead the shortest path to find an adversarial example, as shown in FIG. 2A. Indeed, the shortest path to flip the decision could require to climb over a hill that is opposite to the gradient direction.

While this problem does not hurt the effectiveness of adversarial testing on neural network models, Applicants note it is a non-negligible issue for working on smoothed trees in the setting due to near piece-wise decision surface.

To mitigate this technical machine learning problem, the system of some embodiments is adapted adopt Noise Injected Gradient Ascent, where the system adds sparse noise in each step of optimization such that:

$$x^{(i+1)} = [(1 \pm \xi)x^{(i)} + \nabla_x \mathcal{J}(\widetilde{\mathcal{M}}, x^{(i)}, y)] \text{ for } i \in 1 \ldots |I|, \quad (8)$$

where i denotes iteration of the search, and Applicant samples $\xi_j \sim \mathcal{N}(0, \lambda)$ for a sampled feature index j to maximize the coverage of adversarial example search. For other feature dimension j', the value of $\xi_{j'}$ remains zero.

Here, Applicants introduce a hyper-parameter λ into the system that controls the noise level. FIG. 2B illustrates the purpose of injecting noise into the gradient.

Relative to other whitebox attack algorithms may also introduce noise during the adversarial example search, there are two differences between the approach described herein in some embodiments with the others: 1) in an embodiment, the noise introduced is not additive to the original value x so that the scale of feature value is under consideration, which is particularly useful for applications where features are typically not in the same magnitude. 2) The noise is sparse, which keeps the noise injection one dimension at a time.

This helps to improve the efficiency of noise injection on the smoothed trees as the movement to the closed adversarial examples is always perpendicular to the decision boundary, which is near piece-wise in smoothed tree context.

Feature Dependent Perturbation Tolerance Range

Alternate approaches set a single perturbation tolerance E between original input and adversarial example as $l_\infty$ norm. While, in experimental settings such as image classification tasks, such a setting is reasonable, Applicants note the simple single value tolerance would result in a misleading conclusion. For tabular data as an example, Applicants expect the features to have dramatically different value magnitudes. In certain application domains, Applicants may also expect to have specialized perturbation tolerance for certain features.

This is a particularly critical task to address for the tree based models since the training data of tree ensemble models are not necessarily normalized, which is different with deep learning models. Hence, in some embodiments, the system can be configured to allow the input perturbation to be automatically adjusted for each feature based on feature statistics.

Assuming there is Cumulative Density Function (CDF) $\mathcal{F}_j$ for each feature j, and any feature observation $x_j$ is a sample from the CDF such that $$x_j = \mathcal{F}_j^{-1}(q) \text{ and } q \sim \mathcal{U}(0,1) \quad (9)$$

where $\mathcal{U}$ is a uniform distribution. Applicants propose to bound the feature perturbation in the range $$x_j^{(i+1)} \in [\mathcal{F}^{-1}(\mathcal{F}(x_j)^{(i)} - \in), \mathcal{F}^{-1}(\mathcal{F}(x_j) + \in)] \quad (10)$$

with hyper-parameter $\in \in \mathcal{U}(0,1)$. Intuitive, the above operation enables uniform perturbation (controlled by ∈) with implicit feature normalization.

However, as the CDF is inaccessible in practice, Applicants approximate the CDF thought empirical CDF (or ECDF) by 1) sorting feature observations in the training data, 2) sampling data with their percentile scores (the index of sorted observation list), and 3) and linearly interpolating these feature values and percentile scores.

Tree Sampling for Fast Adversarial Example Search

One problem of determining the full gradient based on the expectation shown in Equation (5) is the computation complexity. This complexity is particularly challenging in practical, real-world implementations where there are constrained or finite computing resources.

As an example of the computational complexity, determining this requires the approach to traverse all the nodes in each of the tree $\mathcal{F}_t$ and lead computational complexity $O(|K_t|+|L_t|)$ for tree with $|K_t|$ nodes and depth $|L_t|$.

In the worst case, Applicants note $|K_t|+|L_t| \approx 2^{|L_t|}$. It is a far more expensive computation than the decision tree before smoothing, where only one path is taken from root to leaf.

Since the length of the path is no longer than the depth of the tree, the complexity is bounded by $O(|L_t|)$. Hence, determining the expectation of smoothed tree ensemble could be exponentially slower than the inference of the original trees.

To mitigate the computational pressure, an approach of some embodiments is proposed to be modified to sample trajectories from each of the smoothed trees in a similar fashion to the original decision tree (only sample one path from all possible paths).

Specifically, Applicants derive the derivative of the smoothed tree ensemble with log-derivative "trick", an approach to avoid a non-differentiable reward function (e.g., policy gradient) to enable sampling:

$$\nabla_x \widetilde{\mathcal{M}}(x) = \nabla_x \sum_{t=1}^{|T|} w_t \sum_{p=1}^{|P_t|} v_p \prod_{l=1}^{|L_p|} \hat{Q}_{t,l}^p(x) =$$

$$\sum_{t=1}^{|T|} w_t \sum_{p=1}^{|P_t|} v_p \prod_{l=1}^{|L_p|} \hat{Q}_{t,l}^p(x) \nabla_x \log \hat{Q}_{t,l}^p(x) \approx$$

$$\sum_{t=1}^{|T|} w_t \underbrace{\left( \sum_{l=1}^{|L_p|} \nabla_x \log \hat{Q}_{t,l}^p(x) v_p \right)}_{\text{gradient of sampled path}} \text{ for } p \sim Mult(P_t, \hat{Q}_t)$$

(11)

Here, one can obtain an unbiased estimation of the derivative $\nabla_x \mathcal{M}(x)$ by sampling single path p for each tree from a multinomial distribution $Q_t = \{\Pi_{l=1}^{|L_{p^1}|} Q_{t,l}^1(x), \ldots, \Pi_{l=1}^{|L_{p^1}|} Q_{t,l}^{|P_t|}(x)\}$.

To reduce the variance of the estimate, Applicants can also configure the system to choose to sample multiple times and take the numerical expectation.

Figure 3A:
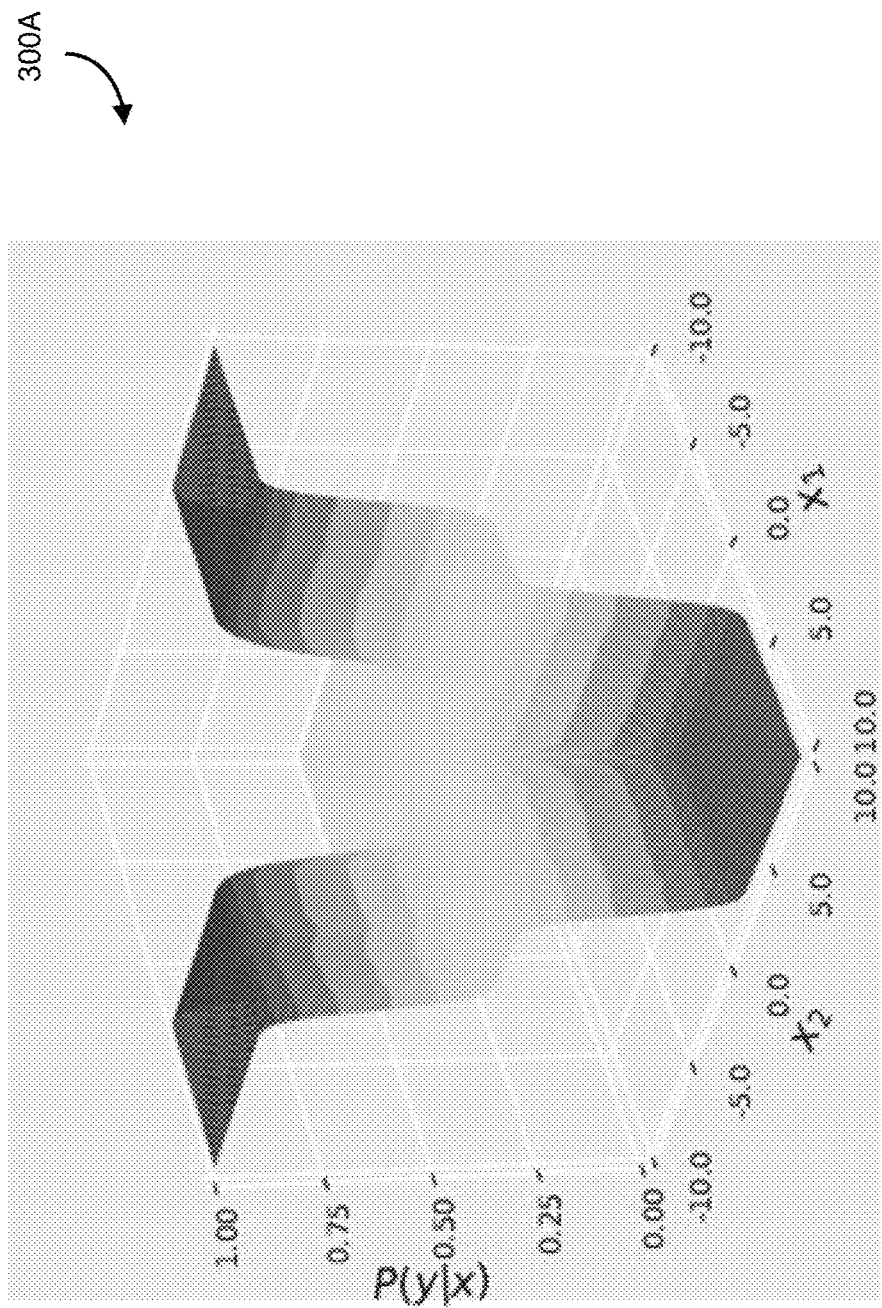
FIGS. 3A-3D provide decision surface comparison between exhaustive search and sampled search with different smoothing temperature.
Figure 3B:
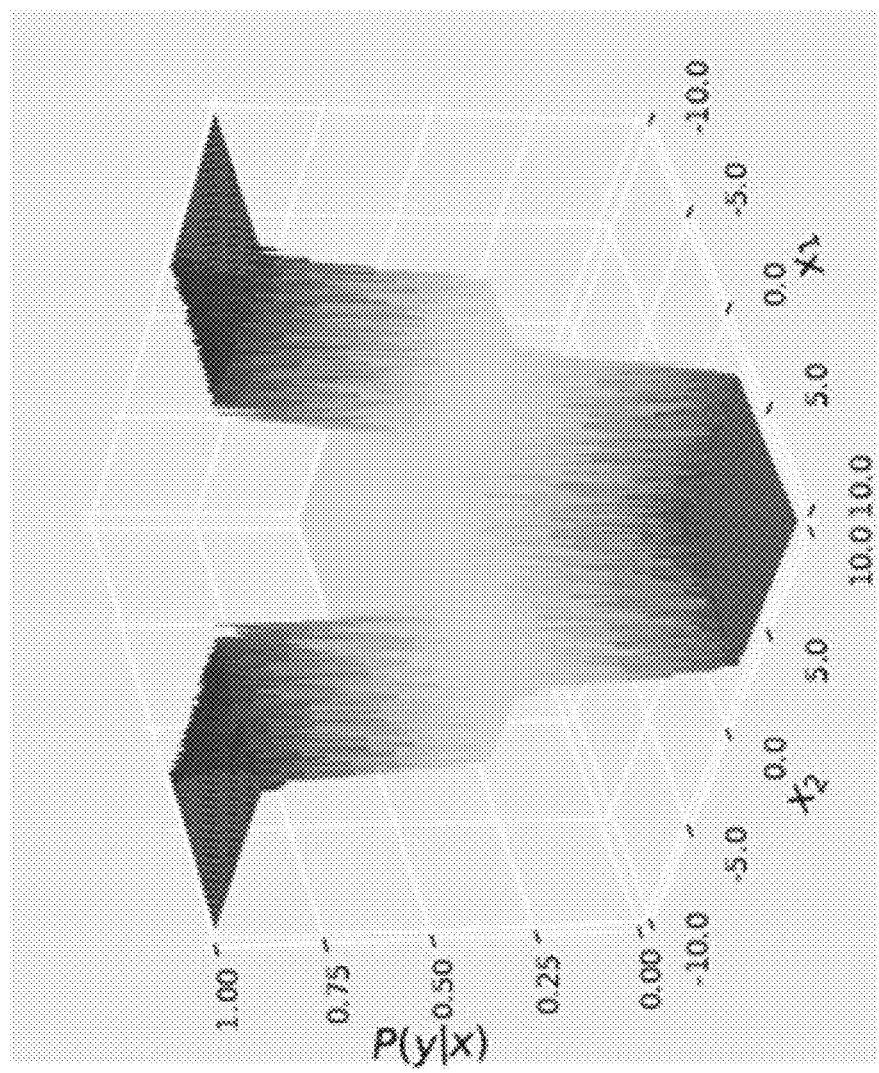
Figure 3C:
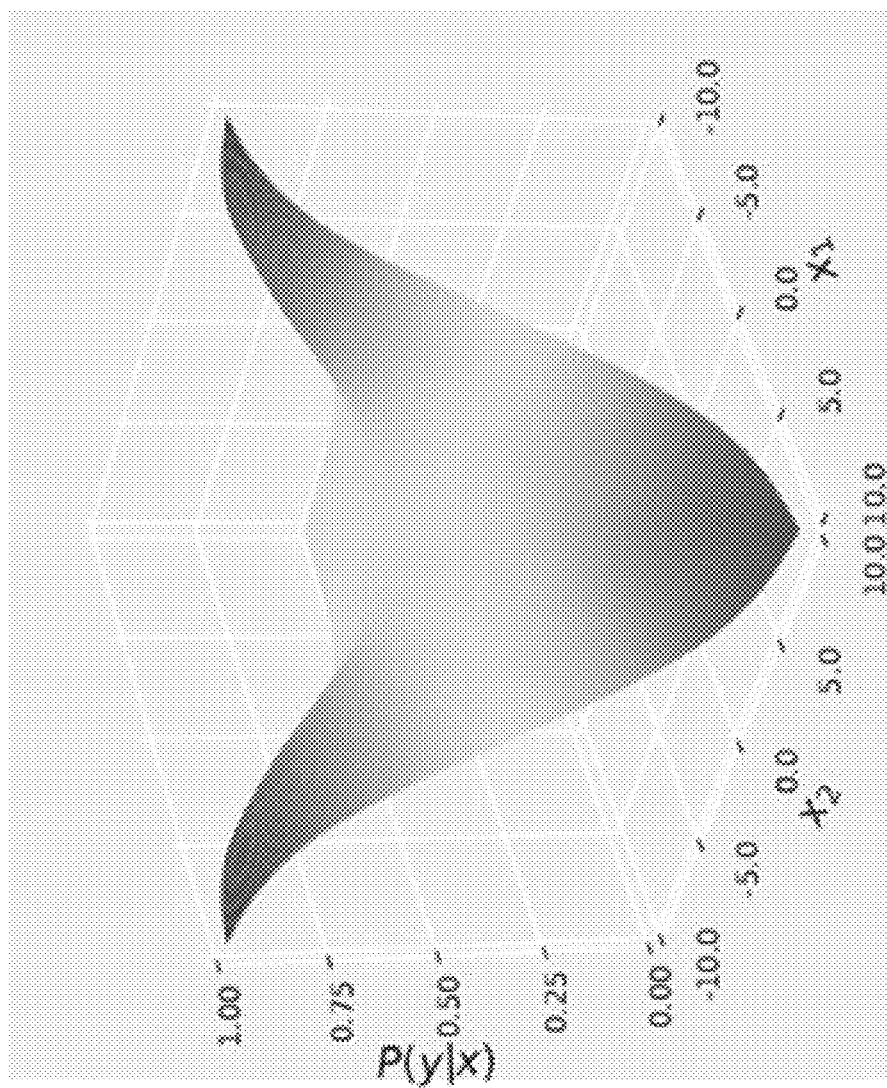
Figure 3D:
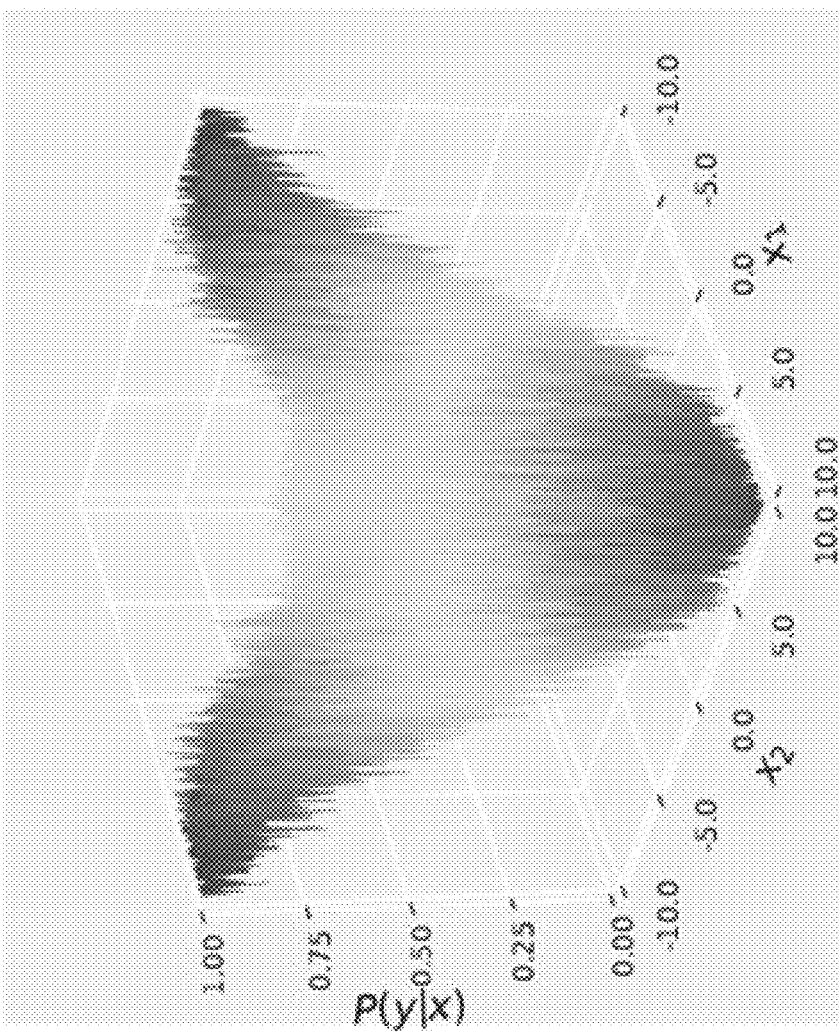

From experiments conducted, Applicants empirically show that sampling once is sufficient to achieve reasonable approximation, as shown in FIG. 3A-3D. The conjecture of the observation is that one can ensemble many trees in the tree ensemble model, which smooths the noise introduced by the sampling. FIGS. 3A-3D provide decision surface comparison between exhaustive search and sampled search with different smoothing temperature. FIG. 3A and FIG. 3B are directed to a low temperature approximation that maximizes the decision boundary preservation. FIG. 3C and FIG. 3D are directed to a high temperature approximation with smoother decision surface that facilitate gradient ascent.

In FIG. 3A, an exhaustive decision surface 300A is shown having temperature τ=0.01. In FIG. 3B, a sampled decision surface 300B is shown having temperature τ=0.01. In FIG. 3C, an exhaustive decision surface 300C is shown having temperature τ=0.1. In FIG. 3B, a sampled decision surface 300D is shown having temperature τ=0.1.

Normalizing Perturbations for Tabular Data

The normalization can be independently performed across each feature j using an empirical cumulative density function $\Gamma_j$ (ECDF). For a given observation x, $p_j=\Gamma_j(x_1)$ is uniformly distributed between [0,1]. In this way, perturbations to $x_j$ may be bounded by the percentile scores: for instance, if $x_j$ is originally in the 75th percentile, and the system limits the approaches in an example implementation to fluctuations of one percentile, then the final perturbed $x_j$ must be within the 74th and 75th percentile of that feature j. Applicants define, from a notational perspective, this bound on percentile fluctuations as $\epsilon$.

More formally, to compute the ECDF, the system is configured obtain a non-uniform subsample of the unique values of a given feature, along with their percentile scores The ECDF for feature j, $\Gamma_j$, and its inverse $\Gamma_j^{-1}$, are then computed by linear interpolation on these values and percentiles. To perform the adversarial attack on an observation x, the system can be configured to map each feature $x_j$ into the range [0,1] using $p_j=\Gamma_j(x_1)$. The system then uses a parameter $\epsilon$, which bounds the magnitude of the perturbation, to derive the bounds $[p_j-\epsilon, p_j+\epsilon]$. The final adversarial example then lies in the range:

$$x_j' \in [\Gamma_j^{-1}(p_j-\epsilon), \Gamma_j^{-1}(pj+\epsilon)] \quad (12)$$

Figure 4A:
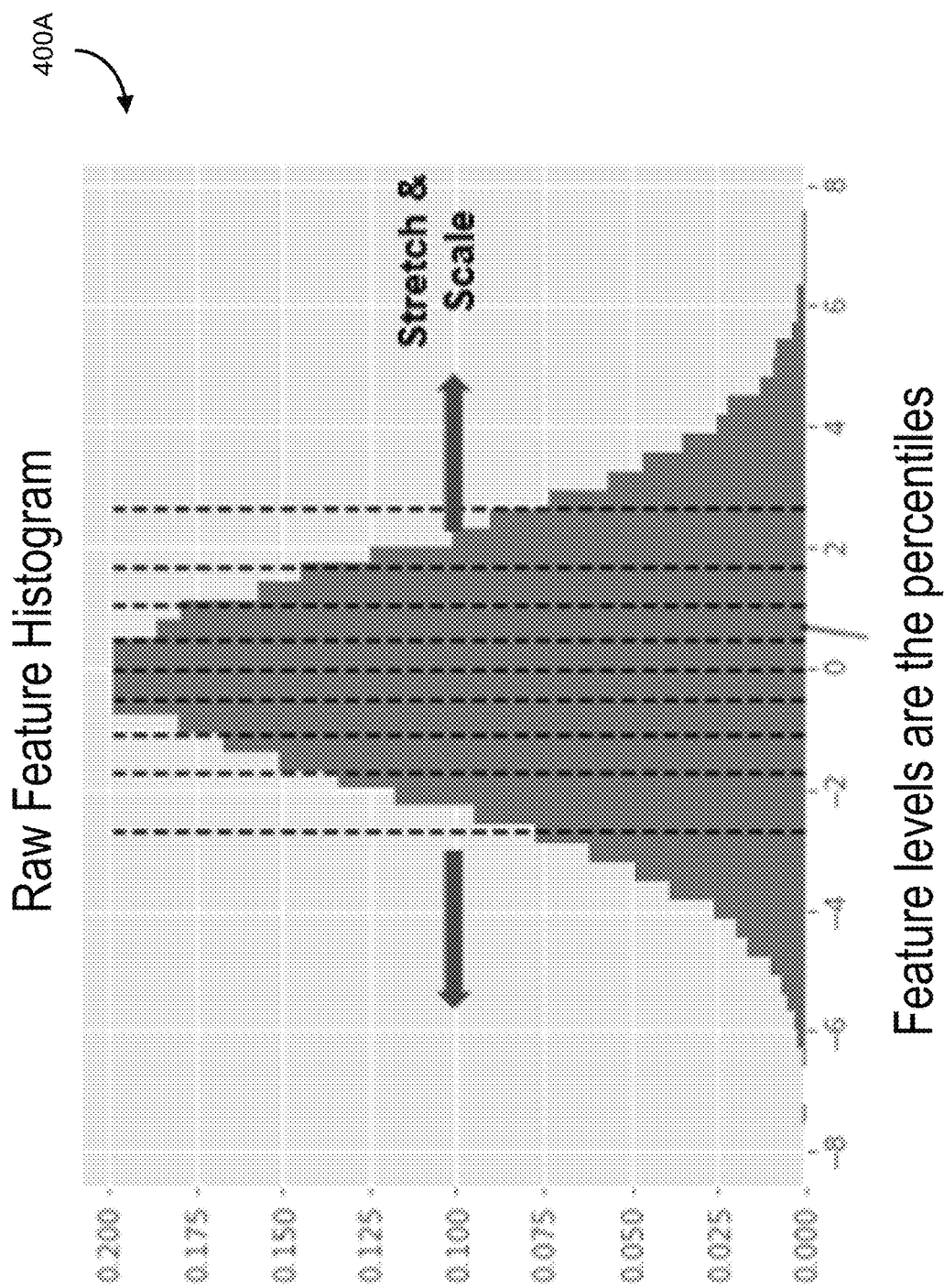
FIG. 4A and FIG. 4B show illustrate normalizing features using quantile transforms
Figure 4B:
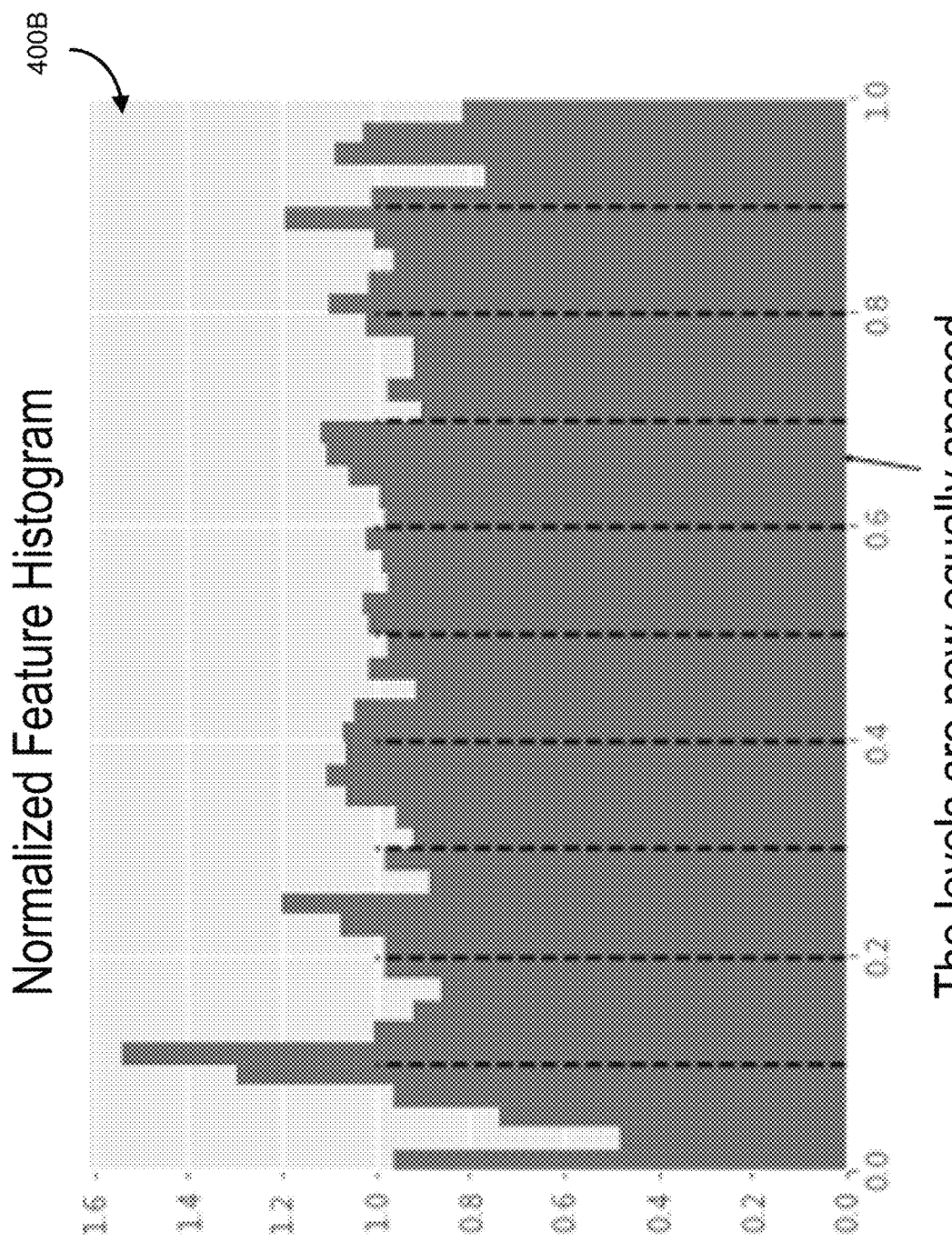

Applicants illustrate these bounds in FIG. 4A and FIG. 4B. Histograms 400A and 400B show illustrate normalizing features using quantile transforms: the cumulative distribution function F maps features uniformly into the range [0,1], in which Applicants define the perturbations.

Smaller values of E thus correspond to tighter bounds, and thus it is harder to find adversarial examples. Applicants may thus characterize the decrease in model performance by examining the degradation of the accuracy score (y-axis) at various level of E (x-axis).

Experiment and Evaluation

Practical experimentation was conducted on a number of different test data sets, including a first data set associated with a computerized credit approval task using sample user information to determine whether bank should issue credit to the user or not. In this example, adversarial examples are tested where, for example, perturbations such as small changes in income in the ones digit, $10000 becomes $10001, were evaluated to assess whether it was able to change an output of a model. A second data set related to an adult salary prediction, where the model is adapted to in an attempt to predict an adult's salary based on observed information.

In this model, an adversarial example could include a shift in education level that is relatively parallel (e.g., two master's degree, one is a master of science, other is a master of engineering) to assess whether the output can be changed. A third data set related to breast cancer diagnoses was considered. In particular, the data set could, for example, relate to diagnosing based on images of regions of tumors, including a texture of greyscale image, medical diagnostic tests, among others, and the adversarial examples could include small perturbations to those textures of the tumor and the size of the tumor to assess whether the output can be changed.

TABLE 1

Performance Comparison of Adversarial Robustness Testing. Here we measure the prediction accuracy after adversarial attack. Lower is better. Results are collected from 3-fold cross-validation, and error shows standard derivation.

| Ensemble | Data Name | Original | Tolerance | STA-Exhaustive | STA-Sampling | GenAttack | NES | Random |
|---|---|---|---|---|---|---|---|---|
| Forest | German Credit | 71.89% ± 1.83% | $\epsilon = 0.2$ | 44.80 ± 2.72 | 45.60 ± 2.73 | 42.90 ± 3.62 | 45.60 ± 2.82 | 70.54 ± 1.50 |
| | | | $\epsilon = 0.5$ | 25.79 ± 12.22 | 26.39 ± 12.67 | 22.69 ± 13.26 | 26.59 ± 12.27 | 66.89 ± 0.86 |
| | | | $\epsilon = 0.8$ | 22.49 ± 11.59 | 22.39 ± 11.33 | 17.69 ± 13.64 | 23.39 ± 11.83 | 64.39 ± 2.64 |

TABLE 1-continued

Performance Comparison of Adversarial Robustness Testing. Here we measure the prediction accuracy after adversarial attack. Lower is better. Results are collected from 3-fold cross-validation, and error shows standard derivation.

| Ensemble | Data Name | Original | Tolerance | STA-Exhaustive | STA-Sampling | GenAttack | NES | Random |
|---|---|---|---|---|---|---|---|---|
| | Adult Salary | 77.59% ± 0.27% | $\epsilon = 0.2$ | 7.07 ± 0.16 | 7.11 ± 0.17 | 7.63 ± 0.22 | 7.24 ± 0.17 | 43.71 ± 1.98 |
| | | | $\epsilon = 0.5$ | 0.54 ± 0.07 | 0.55 ± 0.05 | 0.58 ± 0.02 | 0.76 ± 0.02 | 32.81 ± 1.82 |
| | | | $\epsilon = 0.8$ | 0.18 ± 0.12 | 0.19 ± 0.11 | 0.14 ± 0.13 | 0.43 ± 0.13 | 29.89 ± 1.87 |
| | Breast Cancer | 95.43% ± 1.51% | $\epsilon = 0.2$ | 7.38 ± 2.29 | 8.97 ± 3.01 | 8.09 ± 2.89 | 10.55 ± 2.42 | 89.91 ± 13.99 |
| | | | $\epsilon = 0.5$ | 0.17 ± 0.25 | 0.17 ± 0.25 | 0.17 ± 0.25 | 0.17 ± 0.25 | 51.88 ± 0.25 |
| | | | $\epsilon = 0.8$ | 0 ± 0 | 0 ± 0 | 0 ± 0 | 0 ± 0 | 39.69 ± 0.55 |
| XGBoost | German Credit | 75.29% ± 3.13% | $\epsilon = 0.2$ | 42.29 ± 8.56 | 42.29 ± 8.53 | 25.39 ± 7.32 | 41.49 ± 8.80 | 72.91 ± 2.24 |
| | | | $\epsilon = 0.5$ | 18.19 ± 11.83 | 17.79 ± 11.52 | 14.29 ± 9.25 | 22.39 ± 12.01 | 67.19 ± 5.15 |
| | | | $\epsilon = 0.8$ | 14.39 ± 9.33 | 14.59 ± 9.27 | 8.49 ± 5.81 | 18.89 ± 11.53 | 61.64 ± 8.43 |
| | Adult Salary | 85.28% ± 1.68% | $\epsilon = 0.2$ | 0.76 ± 0.02 | 0.87 ± 0.03 | 0.82 ± 0.02 | 0.98 ± 0.02 | 44.66 ± 0.45 |
| | | | $\epsilon = 0.5$ | 0.42 ± 0.02 | 0.42 ± 0.05 | 0.13 ± 0.04 | 0.66 ± 0.01 | 32.68 ± 0.02 |
| | | | $\epsilon = 0.8$ | 0.42 ± 0.0 | 0.41 ± 0.0 | 0.05 ± 0.03 | 0.63 ± 0.09 | 28.78 ± 0.19 |
| | Breast Cancer | 95.95% ± 0.89% | $\epsilon = 0.2$ | 7.56 ± 2.23 | 7.73 ± 2.18 | 7.38 ± 2.41 | 9.14 ± 2.39 | 84.53 ± 2.51 |
| | | | $\epsilon = 0.5$ | 0.17 ± 0.25 | 0.17 ± 0.25 | 0 ± 0.17 ± 0.25 | 0.17 ± 0.25 | 49.81 ± 2.53 |
| | | | $\epsilon = 0.8$ | 0 ± 0 | 0 ± 0 | 0 ± 0 | 0 ± 0 | 39.78 ± 1.01 |

As shown in Table 1, numerous results are shown with different ensemble types, data sets. The original model accuracy is shown, and the prediction accuracy of the model after adversarial attack is shown for each of the techniques.

Two embodiments are described herein that are compared against reference approaches (GenAttack, NES). The lower the prediction accuracy, the better.

In the experiment, the objective is to attempt to reduce accuracy as far as possible after the adversarial attack to test if the adversarial attack succeeds or not. Successful attacks will reduce the accuracy.

The approaches were able to yield similar, and sometimes improved results in respect of the reference approaches. However, it is important to recall that the approaches described herein are able to operate with much less search time required.

Another difference is that the reference methods are black box attacks while the approaches described herein in some embodiments are white box attacks. The value of epsilon is varied to change the "flipping" range of the model. As epsilon increases, more attacks become valid.

In particular, Table 1 shows evaluation results of two variations of the proposed adversarial robustness testing approach on multiple pre-trained Random Forest and XGboost models learned from multiple UCI datasets. All of the random forest models have 100 estimators with maximum tree depth 4. Other hyper-parameters of the tree ensembles remain default values.

For performance evaluation, Applicants show the accuracy degradation as evidence of the effective adversarial attack. For inference efficiency evaluation, Applicants show the running time as the metric of comparison.

In the experiments, Applicants denote the proposed approaches STA-Exhaustive and STA-Sampling. Here, STA stands for Smoothed Tree Attack. STA-Exhaustive denotes a whitebox attack that exhaustively searches adversarial examples by collecting gradients from all decision trajectories of smoothed trees. In contrast, STA-Sampling denotes the sampling-based whitebox attack described above that reduces the inference time by sampling a single trajectory for each tree. The candidate approaches in the experiments are GenAttack, NES, and Random, where Random denotes random perturbation attack that serves as a baseline approach.

In Table 1, the proposed approaches are effective in terms of looking for adversarial examples. When comparing to the random search baseline, there is a significant performance gap between STAs and Random.

The proposed approaches show competitive performance to the state-of-the-art approaches, GenAttack and NES. In multiple cases (e.g. XGBoost trained on Adult Salary), the proposed approaches show significantly better performance than NES. Here, Applicants highlight that the computational cost of GenAttack is exponentially more expensive than the proposed approaches, as Applicants will show next.

The sampling-based approximation shows a slightly worse performance than the exhaustive approach. However, such performance degradation is not statistically significant.

While working on whitebox attack, the proposed approaches show stable performance on both Random Forest and XGBoost models.

Computational Efficiency Against Combinational Optimization

Figure 5A:
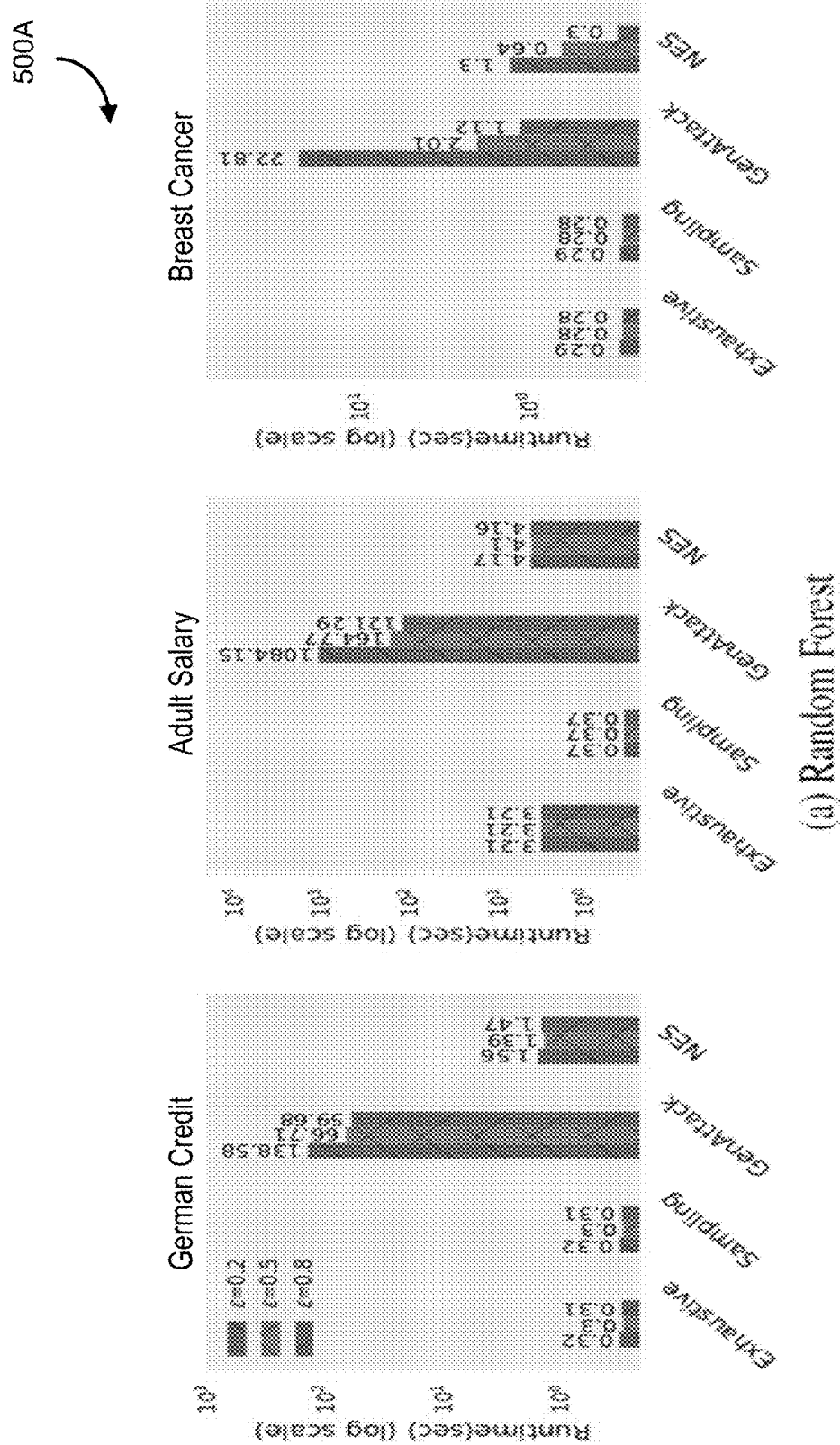
FIGS. 5A and 5B are a set of graphs showing search time comparison between proposed and reference approaches, according to some embodiments
Figure 5B:
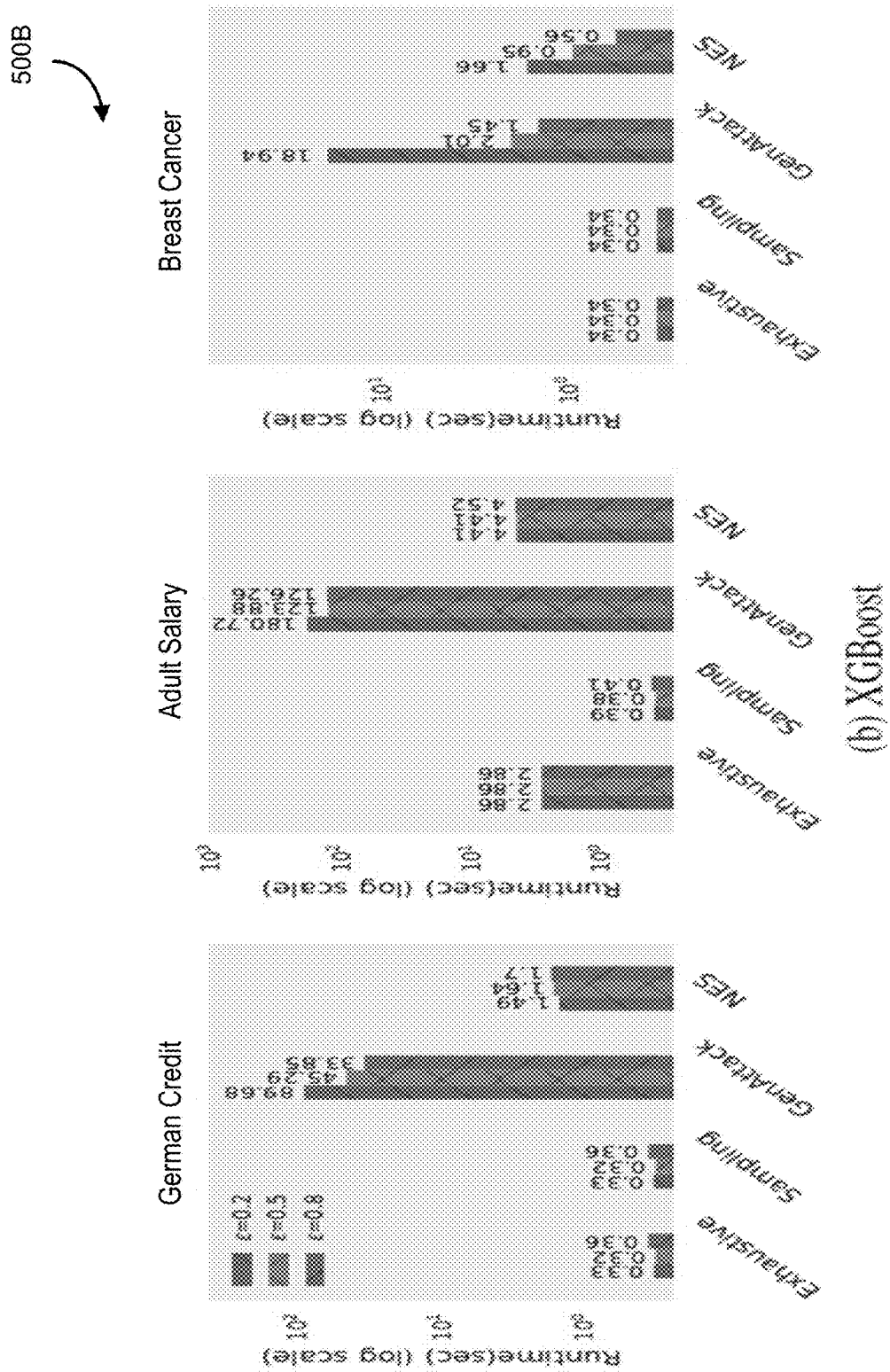

In this experiment, the approach shows the computational efficiency of the proposed approaches. FIGS. 5A and 5B show the run time estimation that conducted on Random Forest models.

Graphs 500A and 500B show search time comparison between proposed and reference approaches, according to some embodiments. Applicants use a log scale for the comparison as the GenAttack shows exponentially more time consumption than other approaches.

For bars, lower is better. Legends (colors/shades) show different perturbation tolerance. Values on top of bars are the actual run time in seconds. Lower is better. Error bars are omitted as the variance is negligible comparing to the significant run time gap among candidates.

Here, Applicants list two important observations:

Exhaustive variant is more than ten times faster than the NES approach and over 100 times faster than the GenAttack with similar performance. The sampling-based approach is even faster than the exhaustive variant (2-8 times faster depending on the application domain).

For GenAttack, smaller perturbation tolerance E usually ends up with longer run time as it is hard to trigger early stop due to the difficulty of searching adversarial example with a small tolerance. As a contrast, the efficiency of the proposed approaches is not sensitive to the size of epsilon.

Combining the observation in FIG. 5A, 5B and Table 1, Applicants note, with similar adversarial attack performance, the proposed approaches show a significant advantage in terms of efficiency, which make the proposed approaches more practical for large-scale testing purpose.

Effectiveness of Tuning Hyper-Parameters

Figures 6A, 6B, 6C:
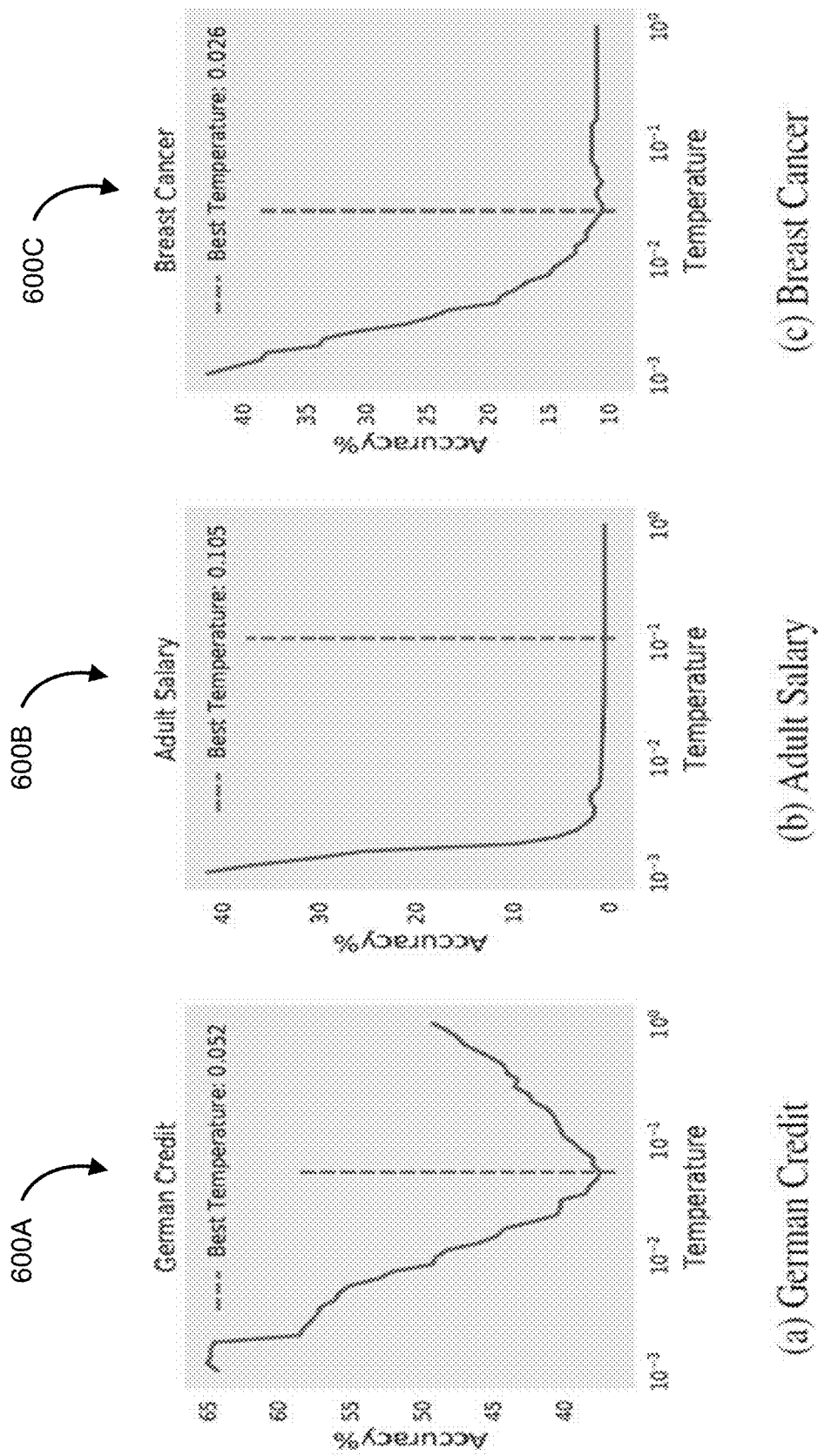
FIG. 6A, FIG. 6B, and FIG. 6C are a set of graphs provided to show the effects of tuning smoothing temperature, according to some embodiments.

FIG. 6A, FIG. 6B, and FIG. 6C are provided to show the effects of tuning smoothing temperature in graphs 600A, 600B, and 600C, according to some embodiments. Temperature appears sensitive to the data (or application domain). Higher temperature is not necessarily a good choice as the adversarial example found from smoothed tree may not valid decision flipper for the original model.

As noted earlier, the temperature hyper-parameter controls the smoothness of the smoothed model. In this experiment, Applicants show how the temperature would impact the adversarial example search.

With a relatively larger smoothing temperature ($10^{-1}$), the whitebox attack usually shows better performance than very low temperature ($10^{-3}$). This is because the low temperature preserves the original model's piece-wise property that prevents gradient descent (as the sigmoid functions are near-saturated). However, it does not mean very high temperature is the best setting for all application domains.

For German Credit dataset (shown in graph 600A), Applicants note the large temperature ($10^0$) could result in poor performance. Applicants note the problem comes from the large approximation gap between the smoothed model and the original model. The adversarial examples of smoothed model are no longer valid examples of the original model. Hence, tuning the temperature can be an important step some approaches in relation to (e.g., in some embodiments, to guarantee) the performance of the proposed approaches.

Effectiveness of Noise Injection on Gradient Descent

FIG. 2A-2D shows the effect of adding noise during adversarial example search. Applicants note the proposed approach (STA-Exhaustive) demonstrated performance improvement for two of three datasets in the experiment with noise injection. This observation reflects that (as shown in FIG. 2A-2D)— it can be useful in some embodiments to add noise during the search on smoothed trees.

Accordingly, a variant approach includes the addition of noise, for example, in an embodiment, spherical noise, and in another embodiment, sparse noise. Since the smoothed tree ensembles still preserve some piece-wise property, it either misguides the direction of the adversarial example search or the search is stuck from the beginning.

descent embodiment and (2) a noise injected gradient descent search version. The approaches represent a version with noise and a version without noise. The with-noise version yields an improvement relative to the version without noise.

Example Computer Implementation

As described herein, a novel adversarial robustness testing approach, STA, (with two variants) for tree ensemble models is proposed. The proposed method includes two-step operations. First, it smooths the tree ensemble models to support auto-differentiation. Second, it conducts whitebox gradient-based attack on the smoothed model for adversarial example search. In order to facilitate the adversarial example search, Applicant introduced multiple modifications that show remarkable performance improvement (in terms of effectiveness and efficiency), including temperature control, noise injection, feature-dependent perturbation bound, and log-derivative-based sampling.

Experiments on four application domains show the proposed approach as a remarkable advantage over other approaches in efficiency (more than ten times faster) while maintaining competitive effectiveness.

Figure 7:
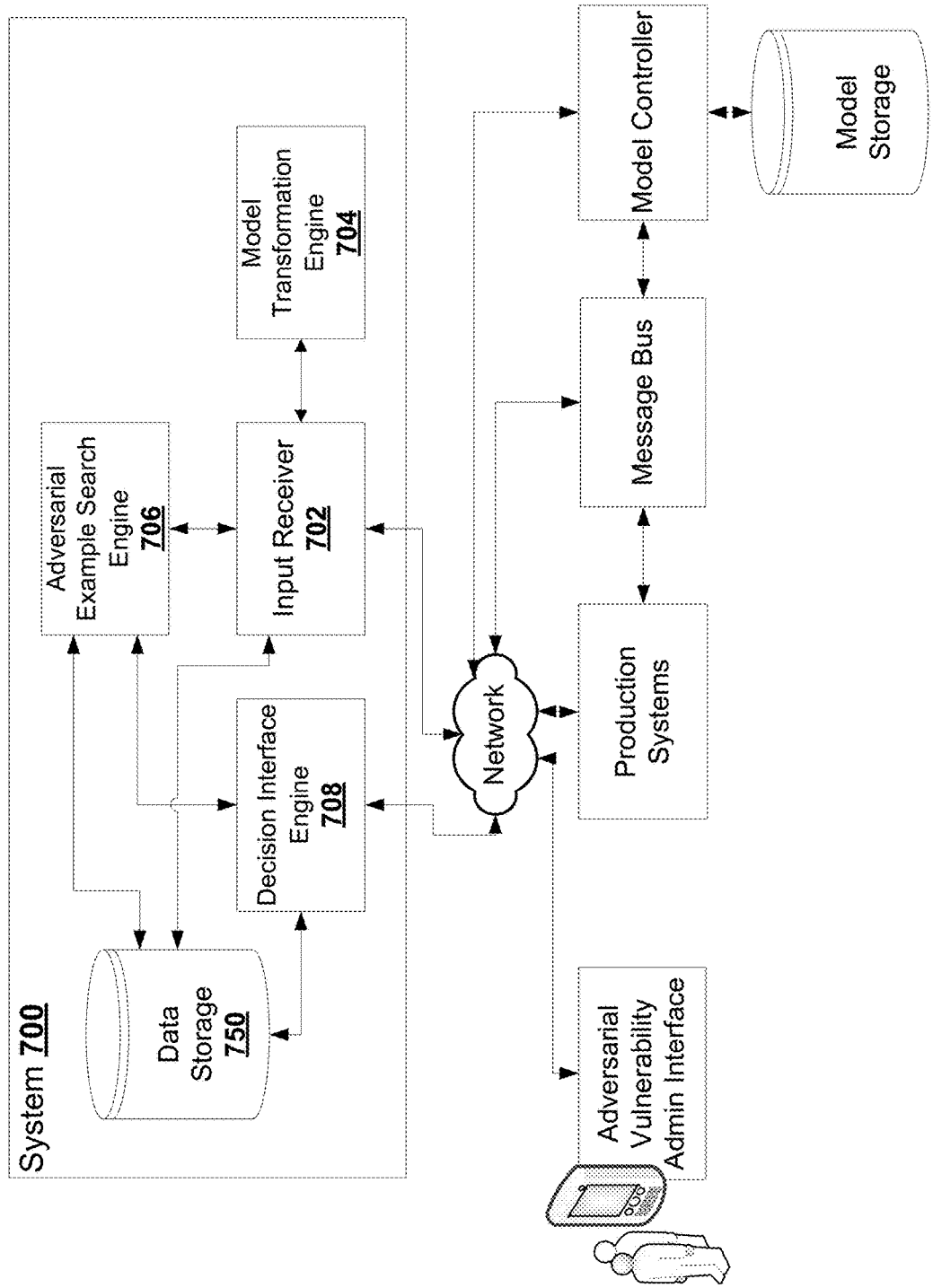
FIG. 7 is a block schematic of an example computer architecture adapted for adversarial vulnerability testing of machine learning models, according to some embodiments.
Figure 8:
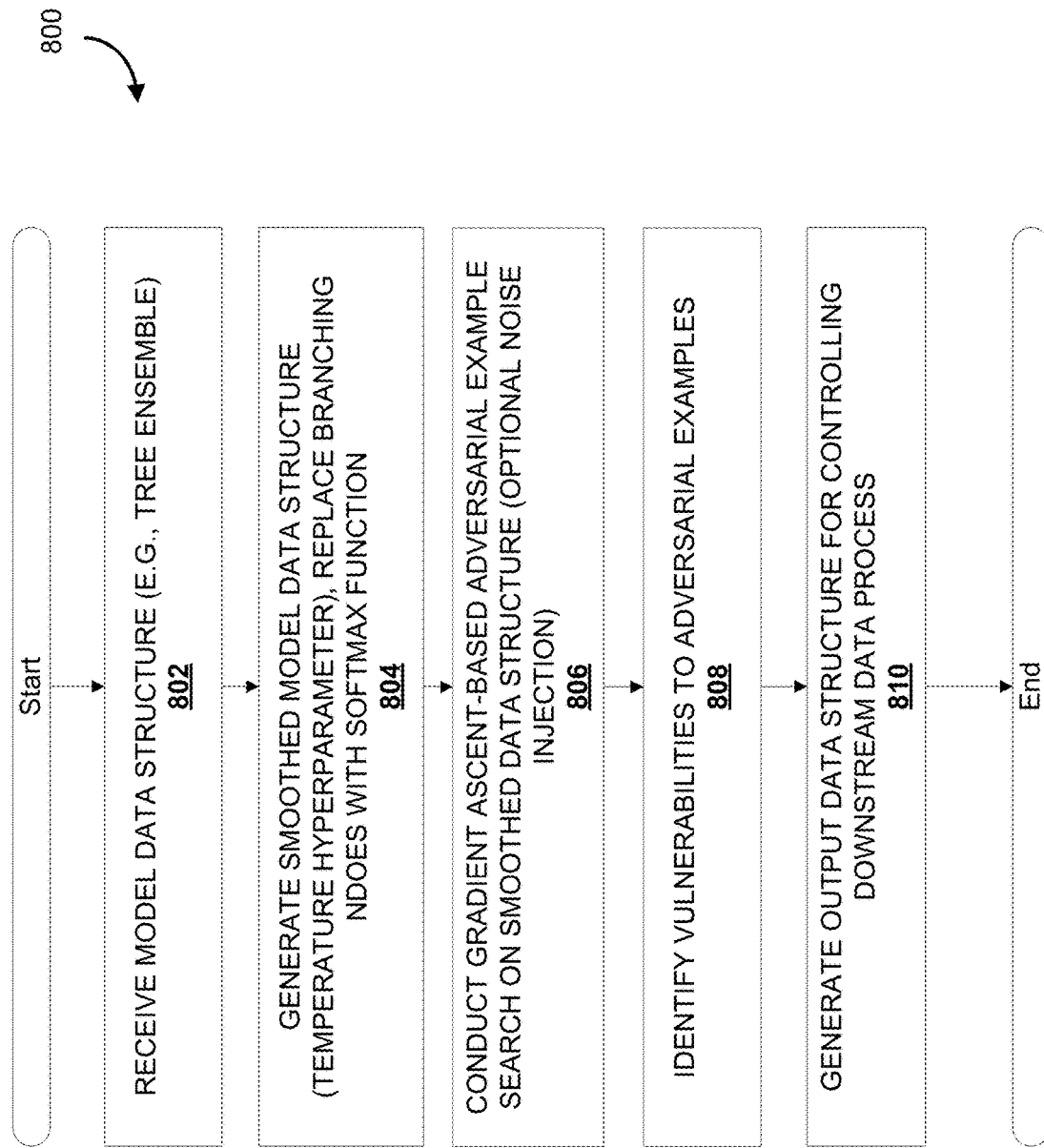
FIG. 8 is an example method diagram illustrating an example process for adversarial vulnerability testing of machine learning models, according to some embodiments.

FIG. 7 is a block schematic of an example computer architecture adapted for adversarial vulnerability testing of machine learning models, according to some embodiments. FIG. 8 is an example method diagram 800 illustrating an example process for adversarial vulnerability testing of machine learning models, according to some embodiments.

A system 700 is implemented using computer components, such as computer hardware, computer software, or embedded firmware. The system 700 is a tool for adversarial vulnerability testing of machine learning models that can be interacted with, for example, using application programming interfaces (APIs) and corresponding data messages which, for example, can be transmitted in a peer to peer manner or through a coupled messaging bus (e.g., in an enterprise solution). The system 700 can reside on a computer or a computing server that has a multitude of functions, or in another embodiment, system 700 can instead be provided on a special purpose machine, such as a computing appliance that can be rack-mounted and coupled to computing infrastructure such as a messaging bus and is specifically configured to generate output data sets based on the adversarial vulnerability testing.

System 700 includes an input receiver 702 which is adapted to receive, at step 802 a data representation of a

TABLE 2

Performance comparison between pure gradient descent and noise injected gradient descent search. All of the variants are based on STA-Exhaustive search. Lower is better. Statistic comes from 3-fold cross-validation.

| | | Random Forest | | | XGboost | | |
|---|---|---|---|---|---|---|---|
| Data Name | Tolerance | Original | Pure Gradient | Noise Injected | Original | Pure Gradient | Noise Injected |
| German Credit | $\epsilon = 0.2$ | 71.89 ± 1.83 | 45.80 ± 2.87 | 44.30 ± 2.89 | 75.29 ± 3.13 | 42.49 ± 8.35 | 36.28 ± 0.38 |
| | $\epsilon = 0.5$ | | 25.89 ± 12.63 | 23.59 ± 13.18 | | 19.39 ± 11.58 | 14.49 ± 9.46 |
| | $\epsilon = 0.8$ | | 22.89 ± 11.21 | 19.97 ± 13.08 | | 14.99 ± 8.90 | 10.99 ± 7.35 |
| Adult Salary | $\epsilon = 0.2$ | 77.59 ± 0.27 | 7.09 ± 0.15 | 7.04 ± 0.15 | 85.28 ± 1.68 | 0.87 ± 0.31 | 0.56 ± 0.07 |
| | $\epsilon = 0.5$ | | 0.56 ± 0.06 | 0.43 ± 0.04 | | 0.42 ± 0.08 | 0.31 ± 0.08 |
| | $\epsilon = 0.8$ | | 0.20 ± 0.11 | 0.12 ± 0.16 | | 0.41 ± 0.10 | 0.30 ± 0.09 |
| Breast Cancer | $\epsilon = 0.2$ | 95.43 ± 1.51 | 7.62 ± 2.51 | 6.21 ± 2.39 | 95.95 ± 0.89 | 7.73 ± 2.18 | 7.56 ± 2.23 |
| | $\epsilon = 0.5$ | | 0.20 ± 0.21 | 0.15 ± 0.09 | | 0.17 ± 0.25 | 0.17 ± 0.25 |
| | $\epsilon = 0.8$ | | 0 ± 0 | 0 ± 0 | | 0 ± 0 | 0 ± 0 |

In Table 2, the evaluation is conducted to test two different variant approaches described herein, (1) a pure gradient model data structure that is provided in a post-processed package. For example, the model data structure can be a trained model data structure that has been adapted to generate one or more output classifications. Example model data structures can include trained machine vision models, loan amount/decision provisioning models, document classification models, among others. These model data structures are the original model data structures that a user wishes to have system 700 evaluate for automatically generating an output indicative of a vulnerability to adversarial examples.

A model transformation engine 704 is configured to generate one or more smoothed model data structures at step 804 through a transformation of the original input model data structure.

The model transformation engine 704 can be tuned, in accordance with various embodiments, to generate different versions of the smoothed model data structures based on different hyperparameters (e.g., temperatures) and in some embodiments, also to inject noise (e.g., Gaussian noise, sparse noise) such that the various model data structures have some level of perturbation. As noted above, the choices in temperatures for smoothing the data structures has a trade-off between computational ease of determining gradients against fidelity to the original input model data structure.

The model transformation engine 704, in some embodiments, stores the smoothed model data structures in model data storage 750.

An adversarial example search engine 706 is configured to at step 806 conduct a gradient ascent-based adversarial example search against one or more of the smoothed models provided by 704 such that an output of the adversarial example search engine 706 includes either one or more adversarial example data structures generated as data sets or an output data value indicating whether the one or more adversarial example data structures generated could be successfully generated. In some embodiments, at step 806, there may be optional noise injection. In some embodiments, this output is encapsulated and provided to decision interface engine 708, at step 808. In some embodiments, vulnerabilities to adversarial examples are identified at step 808.

The output data object can, in some embodiments, be a data structure storing characteristics of the adversarial example or the vulnerability of the input model to adversarial examples. For instance, the output data object could include a Boolean value of vulnerable or not vulnerable, or in more complicated examples, include a multi-dimensional output such as an epsilon metric or include an example generated valid adversarial example (e.g., an image of a gibbon that fools an image discriminator into being classified as a panda).

In a further example, the output data object can be provided to a model controller, which can include processors for controlling downstream data processes, such as re-processing or control decisions made based on the output, at step 810.

For example, where machine learning models are being utilized in various production systems (e.g., online banking, loan decision provisioning), the models can be automatically disabled or removed from usage if they are found to be vulnerable at a particular threshold of vulnerability. The models identified as vulnerable may be re-submitted for re-training or re-tuning, and in some embodiments, this can be automatically instantiated through using, for example, a generated set of adversarial examples for supervised learning to re-tune the margins of the models before automatically re-entering them into use in production systems, for example, if the re-tuned model is able to successfully pass a vulnerability test.

In another embodiment, the model controller is configured to conduct a validation of the adversarial example against the original model. This is particularly useful where the smoothed model has smoothed so much that the smoothed model is actually no longer applicable and causes the generation of a spurious adversarial example. If the adversarial example does not work against the original model, the model controller may generate and transmit a data message to the model transformation engine 704 to modify a temperature hyperparameter.

As described herein, system 700 can be a diagnosis tool provided in the form of a physical computing device having a mechanism adapted for machine learning validation, the mechanism provided in the form of available code functions encapsulated in a library, such that the physical computing device can act as a diagnosis tool or server that receives machine learning models for processing, and generates output data structures representative of a potential level of vulnerability.

For example, the diagnosis tool can be interfaced with as a command-line interpreter (CLI) command or coupled across an application programming interface (API), or a dedicated machine learning analysis server that is connected across a message bus or network interfaces to upstream and downstream computing devices, where upstream computing devices can pass in models for validation, and downstream computing devices can be configured to use validation outputs to control aspects of the operation of the models, such as swapping models, alternating models, de-commissioning models, etc., where models are determined to be potentially vulnerable. In this example, the diagnosis tool can be a physical server appliance residing at a physical data center.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended embodiments are intended to include within their scope such processes, machines, manufacture, compositions of matter, means, methods, or steps.

As can be understood, the examples described above and illustrated are intended to be exemplary only.

What is claimed is:

1. A system for adversarial vulnerability testing of an input non-differentiable machine learning model, the system comprising:
one or more computer processors operating in conjunction with computer memory, the one or more computer processors configured to:
receive an input data object including one or more data elements representing the non-differentiable input machine learning model including a set of piece-wise branching nodes;
transform the non-differentiable input machine learning model to generate a smoothed machine learning model by replacing each piece-wise branching node with a sigmoid function data object;
conduct a gradient-ascent based adversarial example search on the smoothed machine learning model to attempt generation of a valid adversarial example data object, which when processed by the smoothed machine learning model, causes an output classification of the smoothed machine learning model to change relative to an original output classification; and
upon generation of at least valid adversarial example data object, generate an output data object indicative of an adversarial vulnerability of the input non-differentiable machine learning model.

2. The system of claim 1, wherein the transforming of the differentiable input machine learning model is controlled through a temperature hyper-parameter such that a higher temperature hyper-parameter leads to a smoother decision surface while increasing an approximation gap between the input non-differentiable machine learning model and the smoothed machine learning model.

3. The system of claim 1, wherein the temperature hyper-parameter is iteratively tuned over a series of iterations such that the temperature hyper-parameter is iteratively increased until the valid adversarial example data object is generated, and the output data object includes as a data element the temperature hyper-parameter.

4. The system of claim 3, wherein the one or more computer processors are configured to re-validate the valid adversarial example data object by processing the valid adversarial example data object against the input non-differentiable machine learning model.

5. The system of claim 1, wherein the one or more computer processors are configured to inject noise into the smoothed machine learning model prior to the conducting of the gradient-ascent based adversarial example search.

6. The system of claim 5, wherein the noise is sparse noise or spherical noise.

7. The system of claim 1, wherein the conducting of the gradient-ascent based adversarial example search is conducted based on a sampled trajectory from each smoothed tree of the smoothed machine learning model.

8. The system of claim 1, wherein the output data object is utilized to control a rendering of a graphical user interface display element visually indicative of the adversarial vulnerability of the input non-differentiable machine learning model.

9. The system of claim 1, wherein the output data object includes control commands to retrain or modify an architecture of the input non-differentiable machine learning model.

10. The system of claim 1, wherein the output data object includes control commands to enable or disable downstream usage of the input non-differentiable machine learning model.

11. A method for adversarial vulnerability testing of an input non-differentiable machine learning model, the method comprising:
receiving an input data object including one or more data elements representing the non-differentiable input machine learning model including a set of piece-wise branching nodes;
transforming the non-differentiable input machine learning model to generate a smoothed machine learning model by replacing each piece-wise branching node with a sigmoid function data object;
conducting a gradient-ascent based adversarial example search on the smoothed machine learning model to attempt generation of a valid adversarial example data object which when processed by the smoothed machine learning model, causes an output classification of the smoothed machine learning model to change relative to an original output classification; and
upon generation of at least valid adversarial example data object, generating an output data object indicative of an adversarial vulnerability of the input non-differentiable machine learning model.

12. The method of claim 11, wherein the transforming of the differentiable input machine learning model is controlled through a temperature hyper-parameter such that a higher temperature hyper-parameter leads to a smoother decision surface while increasing an approximation gap between the input non-differentiable machine learning model and the smoothed machine learning model.

13. The method of claim 11, wherein the temperature hyper-parameter is iteratively tuned over a series of iterations such that the temperature hyper-parameter is iteratively increased until the valid adversarial example data object is generated, and the output data object includes as a data element the temperature hyper-parameter.

14. The method of claim 13, comprising re-validating the valid adversarial example data object by processing the valid adversarial example data object against the input non-differentiable machine learning model.

15. The method of claim 11, comprising injecting noise into the smoothed machine learning model prior to the conducting of the gradient-ascent based adversarial example search.

16. The method of claim 15, wherein the noise is sparse noise or spherical noise.

17. The method of claim 11, wherein the conducting of the gradient-ascent based adversarial example search is conducted based on a sampled trajectory from each smoothed tree of the smoothed machine learning model.

18. The method of claim 11, wherein the output data object is utilized to control a rendering of a graphical user interface display element visually indicative of the adversarial vulnerability of the input non-differentiable machine learning model.

19. The method of claim 11, wherein the output data object includes control commands to retrain or modify an architecture of the input non-differentiable machine learning model.

20. A non-transitory computer readable medium storing machine interpretable instructions, which when executed by a processor, cause the processor to perform a method for adversarial vulnerability testing of an input non-differentiable machine learning model, the method comprising:
receiving an input data object including one or more data elements representing the non-differentiable input machine learning model including a set of piece-wise branching nodes;

transforming the non-differentiable input machine learning model to generate a smoothed machine learning model by replacing each piece-wise branching node with a sigmoid function data object;

conducting a gradient-ascent based adversarial example search on the smoothed machine learning model to attempt generation of a valid adversarial example data object which when processed by the smoothed machine learning model, causes an output classification of the smoothed machine learning model to change relative to an original output classification; and upon generation of at least valid adversarial example data object, generating an output data object indicative of an adversarial vulnerability of the input non-differentiable machine learning model.

* * * * *